United States Patent
Hua et al.

(10) Patent No.: US 8,649,594 B1
(45) Date of Patent: Feb. 11, 2014

(54) ACTIVE AND ADAPTIVE INTELLIGENT VIDEO SURVEILLANCE SYSTEM

(75) Inventors: Wei Hua, Palo Alto, CA (US); Juwei Lu, San Jose, CA (US); Jinman Kang, San Jose, CA (US); Jon Cook, Los Gatos, CA (US); Haisong Gu, Cupertino, CA (US)

(73) Assignee: Agilence, Inc., Mount Laurel, NJ (US)

( * ) Notice: Subject to any disclaimer, the term of this patent is extended or adjusted under 35 U.S.C. 154(b) by 762 days.

(21) Appl. No.: 12/802,265

(22) Filed: Jun. 3, 2010

Related U.S. Application Data

(60) Provisional application No. 61/217,770, filed on Jun. 4, 2009.

(51) Int. Cl.
*G06K 9/62* (2006.01)

(52) U.S. Cl.
USPC ........... 382/159; 348/143; 348/159; 382/155; 382/190; 706/14

(58) Field of Classification Search
USPC .................. 348/143, 159; 382/155, 159, 190; 706/14
See application file for complete search history.

(56) References Cited

U.S. PATENT DOCUMENTS

| | | | |
|---|---|---|---|
| 5,091,780 A * | 2/1992 | Pomerleau | 348/152 |
| 6,092,059 A | 7/2000 | Straforini et al. | |
| 7,302,451 B2 | 11/2007 | Radhakrishnan et al. | |
| 7,336,890 B2 * | 2/2008 | Lu et al. | 386/239 |
| 7,720,720 B1 * | 5/2010 | Sharma et al. | 705/26.7 |
| 2004/0125877 A1 | 7/2004 | Chang et al. | |
| 2004/0141635 A1 | 7/2004 | Liang et al. | |
| 2005/0102246 A1 | 5/2005 | Movellan et al. | |
| 2005/0190975 A1 * | 9/2005 | Porikli et al. | 382/235 |
| 2006/0010030 A1 * | 1/2006 | Sorensen | 705/10 |
| 2006/0034484 A1 | 2/2006 | Bahlmann et al. | |
| 2007/0279490 A1 * | 12/2007 | Zhou et al. | 348/143 |
| 2008/0162561 A1 | 7/2008 | Naphade et al. | |
| 2008/0201287 A1 * | 8/2008 | Takeuchi | 706/46 |
| 2008/0298766 A1 | 12/2008 | Wen et al. | |
| 2010/0111363 A1 | 5/2010 | Kelly et al. | |
| 2010/0124378 A1 | 5/2010 | Das et al. | |
| 2010/0149385 A1 * | 6/2010 | Tay | 348/241 |
| 2010/0278420 A1 | 11/2010 | Shet et al. | |
| 2011/0311129 A1 * | 12/2011 | Milanfar et al. | 382/154 |

OTHER PUBLICATIONS

Collins, et al., "A System for Video Surveillance and Monitoring", retrieved from http://swing.adm.ri.cmu.edu/pub_files/pub2/collins_robert_2000 1/collins_robert_2000 1 .pdf, 2000, pp. 1-68.

* cited by examiner

*Primary Examiner* — David Lazaro
*Assistant Examiner* — Sarah Drabik
(74) *Attorney, Agent, or Firm* — KPPB LLP

(57) ABSTRACT

A method for assessing events detected by a surveillance system includes assessing the likelihood that the events correspond to events being monitored from feedback in response to a condition set by a user. Classifiers are created for the events from the feedback. The classifiers are applied to allow the surveillance system improve its accuracy when processing new video data.

22 Claims, 23 Drawing Sheets

Learning Event Classifiers for event filtering or event annotation

Learning Event Classifiers for event filtering or event annotation

Ensemble cross-validation learning framework

Balanced feature selection and classifier learning with Adaboost

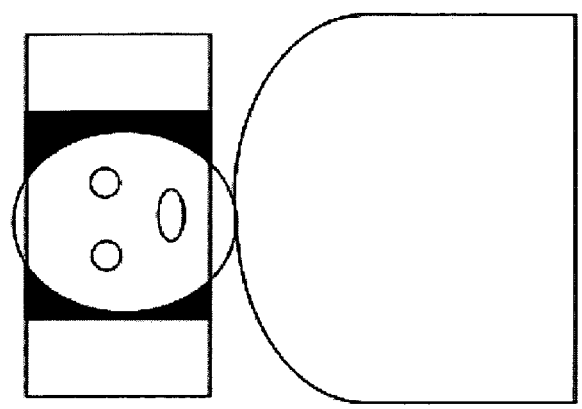
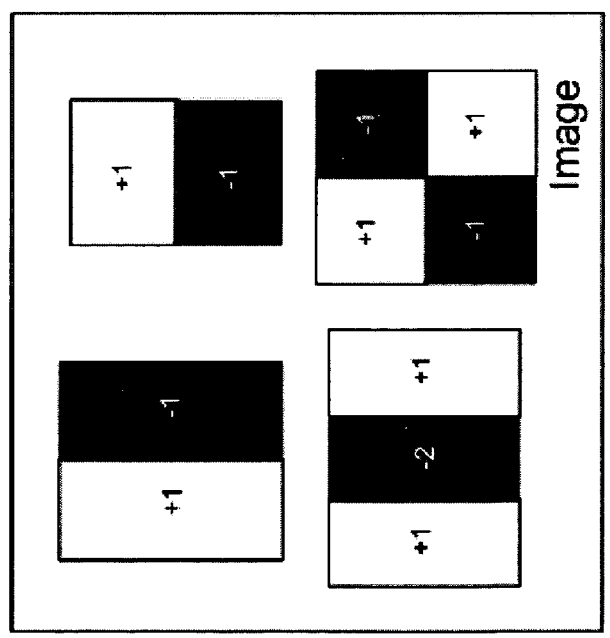
FIG. 15

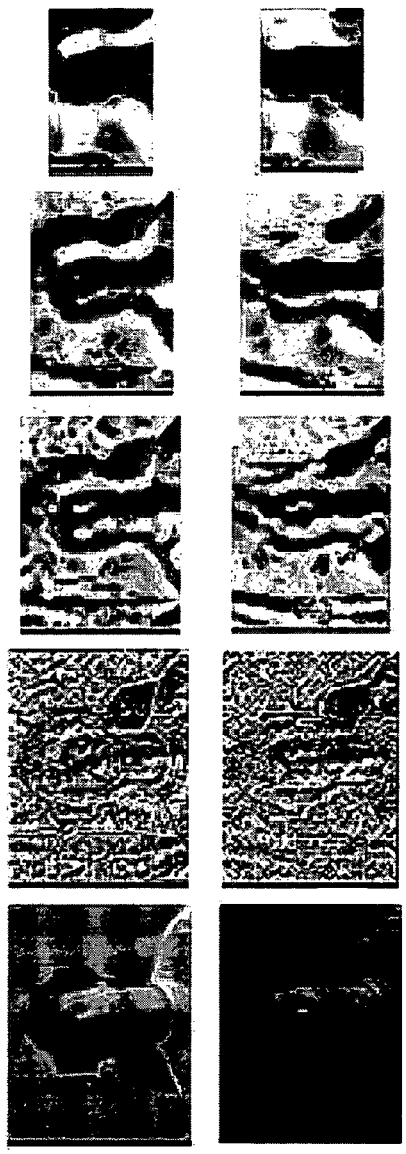
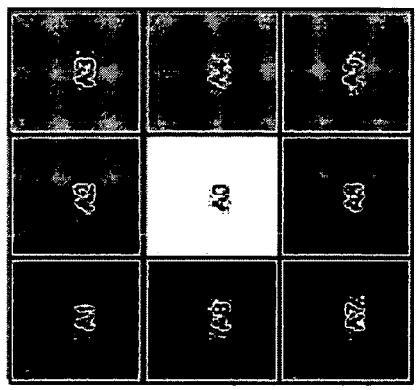
FIG. 16

Input: A training set $\{T_k\}_{k=1}^K$ and a validation set $\{V_k\}_{k=1}^K$ with each one being partitioned to $K$ groups. Let $V^{on} = \{V_k^{on}\}_{k=1}^K$ and $V^{of} = \{V_k^{of}\}_{k=1}^K$. $T_{max}$: the maximal iteration number. $\varsigma_g$: the maximal missing rate.
Initialize the minimal classification error $\varrho_* = 1$, and $\theta = 0$.
Algorithm:
1. Do for $t = 1, \cdots, T_{max}$:
   1.1 Do for $k = 1, \cdots, K$:
      Train a weak classifier with AdaBoost, $h_{k,t}$, by using the training set $T_{k,\cdot}$.
      Add $h_{k,t}$ to the ensemble classifier, $H_k = \sum_{i=1}^t h_{k,i}$.
   1.2 Compute the ECV classification errors of $\mathcal{H} = \{\mathcal{H}_\parallel\}_{\parallel=\infty}^K$ on $V^{on}$ and $V^{of}$ by using the method depicted in Fig. 16 to get: $\varrho_t^{on} = Er(\mathcal{H}, V^\lambda)$ and $\varrho_t^{of} = Er(\mathcal{H}, V^\lambda)$.
   1.3 Regularize the online and offline errors to get an overall error: $\varrho_t$ by Eq. 28
   1.4 If $\varrho_t \leq \varrho_*$ then set $\varrho_* = \varrho_t$, $T_* = t$, and $\mathcal{H}_* = \mathcal{H}$
      else exit current loop to the step 2.
2. Calculate two ROC tables $\mathcal{R}^\lambda(\varsigma^\lambda(\theta), v^\lambda(\theta))$ and $\mathcal{R}^t(\varsigma^t(\theta), v^t(\theta))$ with $Er(\mathcal{H}_*(\theta), V^\lambda)$ and $Er(\mathcal{H}_*(\theta), V^t)$ by varying the $\theta$ values, respectively.
3. Determine $\theta_* = \text{MIN}(\theta_g^{on}, \theta_g^{of})$, where $\theta_g^{on}$ and $\theta_g^{of}$ make $\varsigma^{on}(\theta_g^{on}) = \varsigma_g$ and $\varsigma^{of}(\theta_g^{of}) = \varsigma_g$.
Output A set of $K$ ensemble-based classifiers, $\mathcal{H}_* = \{\mathcal{H}_\parallel\}_{\parallel=\infty}^K$ with $H_k = \sum_{i=1}^{T_*} h_{k,i} - \theta_*$.

FIG. 17

Function: $Er(\mathcal{H}, \mathbf{L})$ to compute the ECV classification error.

Input: A set of $K$ ensemble-based classifiers, $\mathcal{H} = \{\mathcal{H}_{\parallel}(\theta)\}_{\parallel=\infty}^{K}$, and a data set $\mathbf{L} = \{L_k\}_{k=1}^{K}$ partitioned to $K$ groups. $L_k$ is not involved in training of $H_k$. $\mathbf{L}$ contains $N_+$ positive samples and $N_-$ negative samples.

Initialize the number of missed positive samples, $\epsilon_m = 0$, and the number of false positive samples, $\epsilon_f = 0$.

Do for $k = 1, \cdots, K$:

1. Apply $H_k(\theta)$ to $T_k$ to get the missed positive sample number $\epsilon_{m,k}$, and the false positive sample number $\epsilon_{f,k}$.

2. Compute $\epsilon_m = \epsilon_m + \epsilon_{m,k}$, and $\epsilon_f = \epsilon_f + \epsilon_{f,k}$.

Output The missing rate, $\varsigma = \frac{\epsilon_m}{N_+}$, the false rate, $\upsilon = \frac{\epsilon_f}{N_-}$, and the overall error rate, $\varrho = \frac{\epsilon_m + \epsilon_f}{N_+ + N_-}$.

FIG. 18

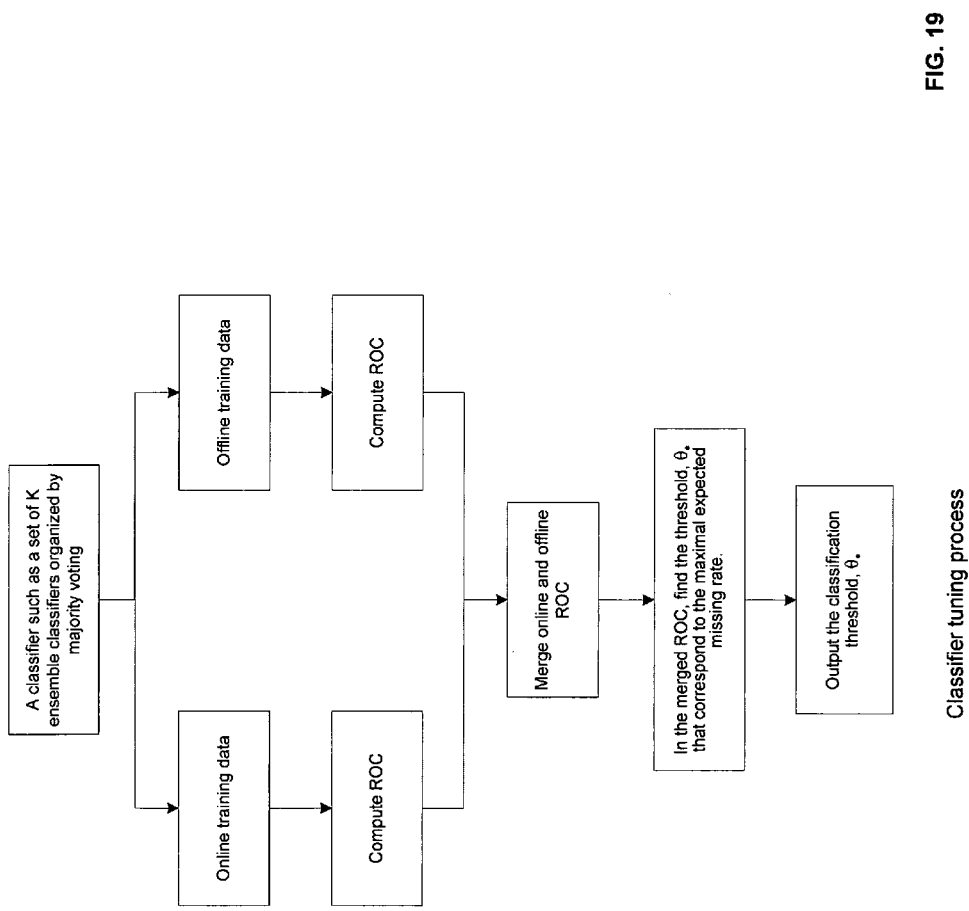

Conventional performance tuning scheme for multiple behaviors

Score mapping function computation process

US 8,649,594 B1

ACTIVE AND ADAPTIVE INTELLIGENT VIDEO SURVEILLANCE SYSTEM

RELATED APPLICATION

This application claims priority to provisional U.S. patent application Ser. No. 61/217,770 filed Jun. 4, 2009, titled "An Active and Adaptive Intelligent Video Surveillance System", the full and complete subject matter of which is hereby expressly incorporated by reference in its entirety.

FIELD

Embodiments of present invention relate to an intelligent surveillance system. More specifically, embodiments of the present invention relate to systems that use video and other sensor inputs where monitoring is performed automatically by a computer system.

BACKGROUND

In some conventional intelligent video surveillance systems, a first set of video processing algorithms is used to detect, track, and classify objects while a second set of algorithms is used to infer the events based on the temporal and spatial information of the objects and preset rules. In these systems, the algorithms developed have very limited ability to adapt to new and unseen environments. In the past, auto-adaptation techniques that were available did not adapt well to active surveillance systems. For example, background modeling algorithms in the systems made adaptations when the background changed. However, the goal of these adaptations was only to determine the change in the scene. The definition of the change was fixed and non-adapting. Other types of auto-adaptation techniques such as ground plane calibration did not improve the intelligence of the system over time, as they did not accumulate knowledge.

Conventional intelligent video surveillance systems were typically trained on a limited data set. For some of these conventional video surveillance systems, scalability problems would arise due to the difficulty in obtaining or generating a complete data set that represents all the conditions that could be found. Even if creating such a complete data set was possible, it would be difficult for the systems to process and learn this complete data set. The complexity of such systems would be difficult to build and deploy. Thus, conventional video surveillance systems have difficulties detecting and classifying objects of interests where the systems generate false detections when processing new conditions in new environments not seen before.

BRIEF DESCRIPTION OF THE DRAWINGS

The features and advantages of embodiments of the present invention are illustrated by way of example and are not intended to limit the scope of the embodiments of the present invention to the particular embodiments shown.

FIG. 15 illustrates four prototype templates of the rectangular Haar wavelet like features on the left.

FIG. 16 illustrates examples of a 3×3 kernel and Local Binary Pattern extraction according to an embodiment of the present invention.

FIG. 17 illustrates a pseudo code implementation of an ECV learning scheme.

FIG. 18 illustrates a pseudo code implementation of a function which computes ECV classification error.

FIG. 19 is a flow chart illustrating a classifier tuning procedure according to an embodiment of the present invention.

SUMMARY

An important characteristic in a successful intelligent video surveillance system is the ease in which the system can be adjusted for optimal performance in each specific site installation. The complexity of real world environments and scenarios post tremendous challenges for an intelligent system to have applications general enough for mass deployment. The intelligence of a passive conventional system is fixed after the installation, and will not improve its performance over time. Such a system is difficult to scale up. An active intelligent system is disclosed that has the ability to improve the knowledge and the intelligence of the system and adapt to new environments without requiring professional user involvement. According to an embodiment of the present invention, an active system is disclosed that relieves the user from learning the complex system parameters and adjusting the system during an installation. The active system is capable of automatically improving the performance of system after installation. Embodiments of the present invention also give the system integrator more flexibility to deploy the system at different sites.

According to an embodiment of the present invention, the complexity of the system is made manageable by limiting the focus of the system to one or more specific environments and dramatically reducing the data space required to be processed. The performance of the system disclosed may be measured by the accuracy of the system. The accuracy of the system may be based on the accuracy of detection of events, the accuracy of certain statistics of scenes, and the accuracy of other attributes that is generated by the system. The accuracy of event detection can be measured by miss and false detection rates. The statistics may include a count of people, crowd density, traffic congestion status, and other parameters.

According to an embodiment of the present invention, mechanisms are disclosed that actively and automatically tune an intelligent video surveillance system to achieve high performance after the system is installed. The system also utilizes off-line data from outside the installed environment to tune the system so it is able to detect and classify events that may be found in other environments. Thus, the system will be able to maintain a default ("average") performance while improving its accuracy at its installed environment.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, and programs are shown in block diagram form to avoid obscuring embodiments of the present invention unnecessarily.

Figure 1:
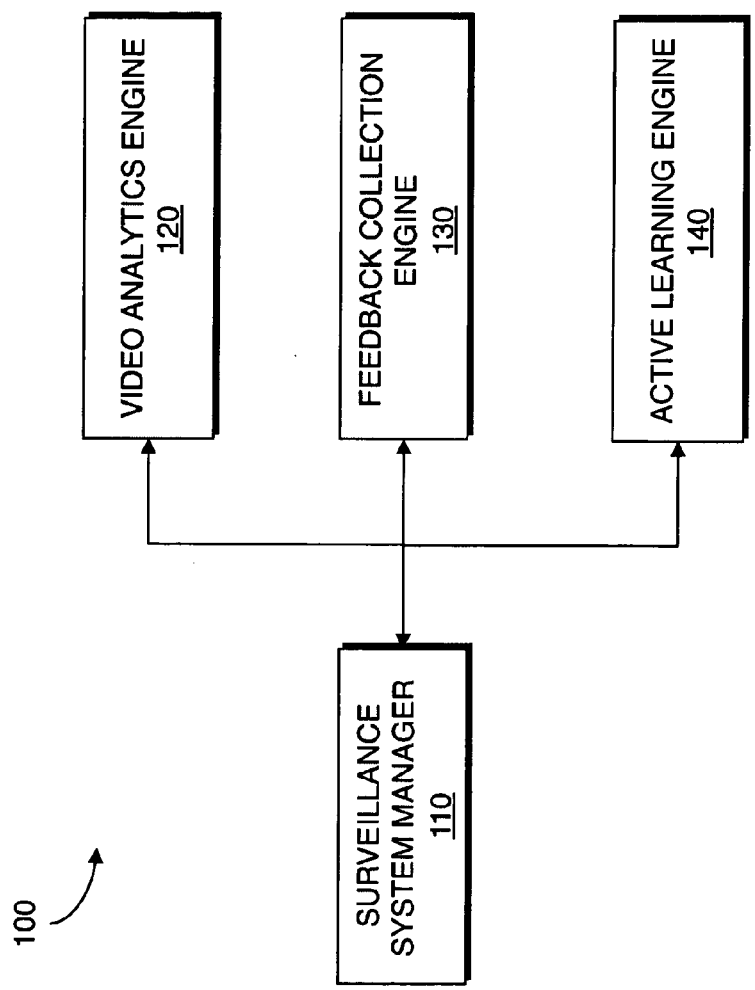
FIG. 1 is a block diagram of a surveillance system according to an exemplary embodiment of the present invention.

FIG. 1 is a block diagram of a surveillance system 100 according to an exemplary embodiment of the present invention. According to one embodiment, the surveillance system 100 may be performed by a computer system executing sequences of instructions represented by the modules shown in FIG. 1. Execution of the sequences of instructions causes the computer system to support an active and adaptive intelligent video surveillance system as will be described hereafter. In alternate embodiments, hard-wire circuitry may be used in place of or in combination with software instructions to implement the present invention. Thus, the present invention is not limited to any specific combination of hardware circuitry and software. The surveillance system 100 includes a surveillance system manager 110. The surveillance system manager 110 is connected to and transmits data between the components of the surveillance system 100.

Block 120 represents a video analytics engine. The video analytics engine 120 receives video from one or more cameras (not shown) in the surveillance system 100. According to an embodiment of the present invention, the video analytics engine 120 generates an on-line data set from the video data. The on-line data set may include events and feature data. An event may include an image of an event that occurred and the feature data may be one or more numeric values that represents features of the event. According to an embodiment of the present invention, the feature data may provide an indication of the likelihood that an event that occurred matches an event being monitored by the surveillance system.

Each event detected by the surveillance system 100 may have specific feature data associated with it. For example, a human intrusion event may have feature data generated by a human intrusion detection algorithm that tracks specific features of a human being. An unattended object event may have feature data generated by an algorithm that tracks the appearance of the object and how stable the object is. The feature data for events that are monitored may be used by the surveillance system to improve its accuracy.

Block 130 represents a feedback collection engine. The feedback collection engine 130 collects feedback about events or other attributes of the surveillance system. According to an embodiment of the present invention, the feedback collection engine 130 may present the event to a user and solicit a response from the user as to whether the event is a true or false event that matches or does not match an event being monitored. In one embodiment, annotation labels may be provided by a user to help create specific event classifiers. The feedback collection engine 130 may also or alternatively collect feedback from another detection module running in parallel in the surveillance system that has a different detection capability or collect feedback using a different algorithm for assessing the likelihood that the event that occurred matches the event being monitored. For example, a human detector based tracking algorithm may be used together with a foreground object based motion tracking algorithm. The differences detected can be used to provide feedback to one another since their false detections are usually very different. Feedback provides a way to improve the default detection rate.

Block 140 represents an active learning engine 140. The active learning engine 140 may be invoked automatically or manually by a user. According to an embodiment of the present invention, the active learning engine 140 may be invoked when a number of false events detected exceeds a predetermined threshold value. The active learning engine 140 may use on-line feature data and feedback to generate event classifiers that can be used for classifying the events detected. According to an embodiment of the present invention, the event classifier may operate as a filter to filter out unwanted events that are determined not to match the event to be monitored. Alternatively, the event classifier may operate as a sorter to sort, classify, and label the event that occurred into one of many types of events that are being monitored.

According to an embodiment of the present invention, the active learning engine 140 may also use off-line feature data from an off-line data set. In order to ensure that an event classifier operating as a filter does not filter out correct events, a large off-line data set may be used along with the on-line data set to generate a filter. The off-line data may include a large sample data set of possible true event feature data, and/or model data that represents a default average detection system. The use of off-line data may be helpful in calibrating and tuning a system since the number of true events in an on-line data set may be small. In some instances it may not be possible for the active learning engine 140 to formulate the characteristics of the true events in one specific environment by using on-line data alone. The use of off-line data will ensure that the surveillance system 100 maintains average performance for those true events that have not been seen but improve the accuracy by using the events that have been seen. According to an embodiment of the present invention, when the surveillance system 100 is detecting perimeter intrusion, the off-line data set may include representative positive samples of humans and vehicles. This offline data serves to provide the surveillance system with a broad sampling of information.

The event classifier generated by the active learning engine 140 may be applied to each event generated and a confidence score may be calculated by running the event classifier for the event. The score may be used to determine if the event is wanted or not. According to an embodiment of the present invention, the active learning engine 140 produces an event classifier with a default threshold that has a fixed expectation miss rate and a maximized false event reduction rate. For example, the active learning engine may create an event classifier operating as a filter that aims to achieve a miss rate of less than 5%. According to an embodiment of the present invention, all scores are normalized and aligned and one threshold can be applied to all filters. According to an alternate embodiment of the present invention, the user may set different thresholds for different zones monitored by the surveillance system 100. In this embodiment, zones where security is more important may have score thresholds set lower. Zones where security is less important may have score thresholds set higher.

It should be appreciated that the event classifiers created by the active learning engine 140 may be created for one camera or any number of cameras. The event classifiers may be applied or not applied to video data originating from one or more specific cameras. It should also be appreciated that user may also specify what type of data from an on-line data set is to be used to generate an event classifier. For example, a user may specify that on-line data set data generated from video data from one camera, but not from another camera may be used to generate a specific event classifier.

According to an embodiment of the present invention, events processed by an event classifier such as filtered events remain in the system and a user may choose to display them and provide feedback to miss detections to improve the detection rate the next time the active learning engine 140 is invoked. The active learning engine 140 can also generate receiver operating characteristic (ROC) curves to provide a user with the expected miss and false rate for any threshold chosen. The confidence score may be displayed with the event and the event list may be sorted by the confidence score.

It should be appreciated that the event classifiers can be generated based on annotation labels. This allows events to be easily retrieved based on their annotation labels and scores. For example, a dog annotation event classifier may be created for all intrusion events caused by dogs. The event may be annotated as "dog" if the system decides that the event is likely caused by a dog. Such an annotation capability provides additional flexibility for the user to manage the large amounts of events process by the surveillance system 100. According to an embodiment of the surveillance system 100, the generated event classifiers are stored along with the details describing the event classifiers and their attributes. The event classifiers are managed, and can be manually or automatically applied to detection instances.

After the event classifiers are generated by the active learning engine 140, the surveillance system manager 110 may apply the event classifiers to new on-line data sets generated by the video analytics engine to allow the surveillance system 100 to more accurately process video data. This would allow the surveillance system 100 to improve its detection and/or classification of events being monitored.

Figure 2:
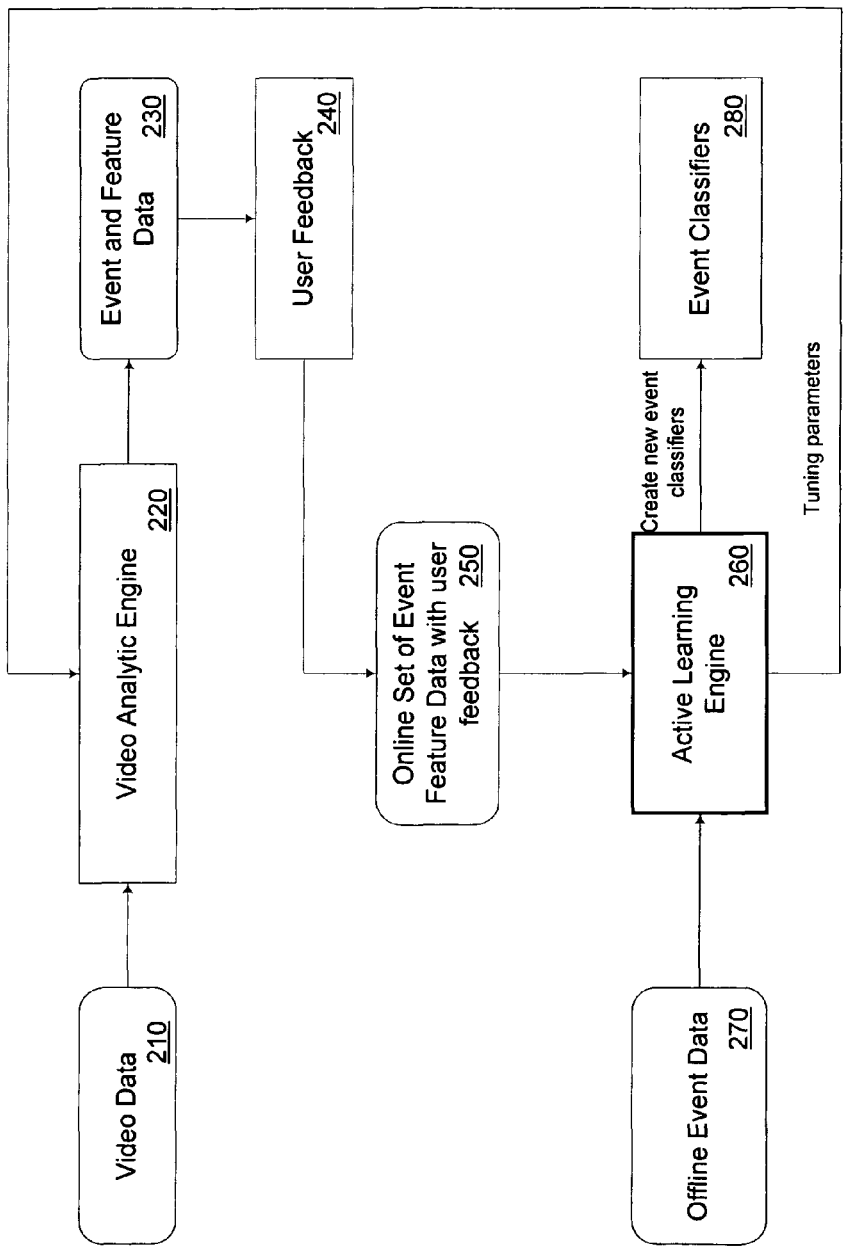
FIG. 2 is a flow diagram illustrating the work flow of a surveillance system according to an embodiment of the present invention.

FIG. 2 is a flow diagram illustrating the work flow of a surveillance system according to an embodiment of the present invention. A video analytic engine 220 receives on-line video data 210 originating from one or more video cameras in the surveillance system. The video analytic engine 220 generates events of interest along with feature data 230. The feedback collection engine 240 presents the events to a user and solicits the user's feedback regarding whether the events match events that are being monitored by the surveillance system. The on-line set of events and feature data and user feedback 250 are provided to an active learning engine 260. Also provided to the active learning engine is offline event data 270 which includes off-line feature data. The feature data and feedback will then be used by the active learning engine to create event classifiers 280. The event classifiers generated by the active learning engine 260 may be used as tuning parameters for the video analytic engine 220.

Figure 3:
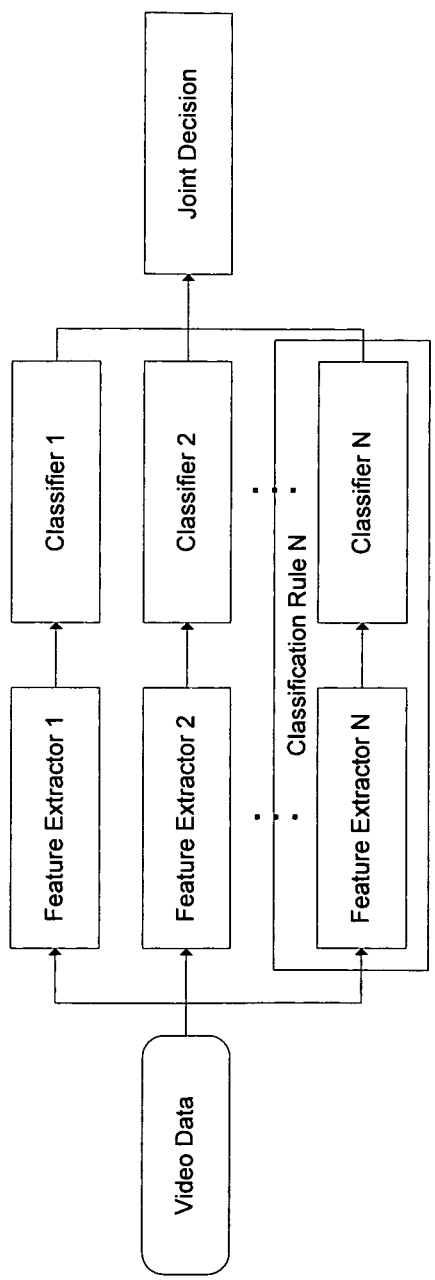
FIG. 3 illustrates a framework of a rule based classification procedure according to an exemplary embodiment of the present invention.

According to an embodiment of the present invention, when the surveillance system is used to detect perimeter intrusion, the video analytic engine uses a rule based classification (RBC) procedure to classify events and generate feature data. The RBC procedure may follow the framework illustrated in FIG. 3 according to an embodiment of the present invention, and be an ensemble of four novel classification rules, the human classification rule, vehicle classification rule, saliency classification rule, and trajectory classification rule. The RBC procedure may classify events into one of four categories: Human, Vehicle, Objects, and Noise. The category of Object includes any objects other than Human, Vehicle, and Noise. The event feature data of the perimeter intrusion includes the features created by the RBC procedure and an image of the object that is detected. The four classification rules are described as follows.

A. Human Classification Rule

Figure 4:
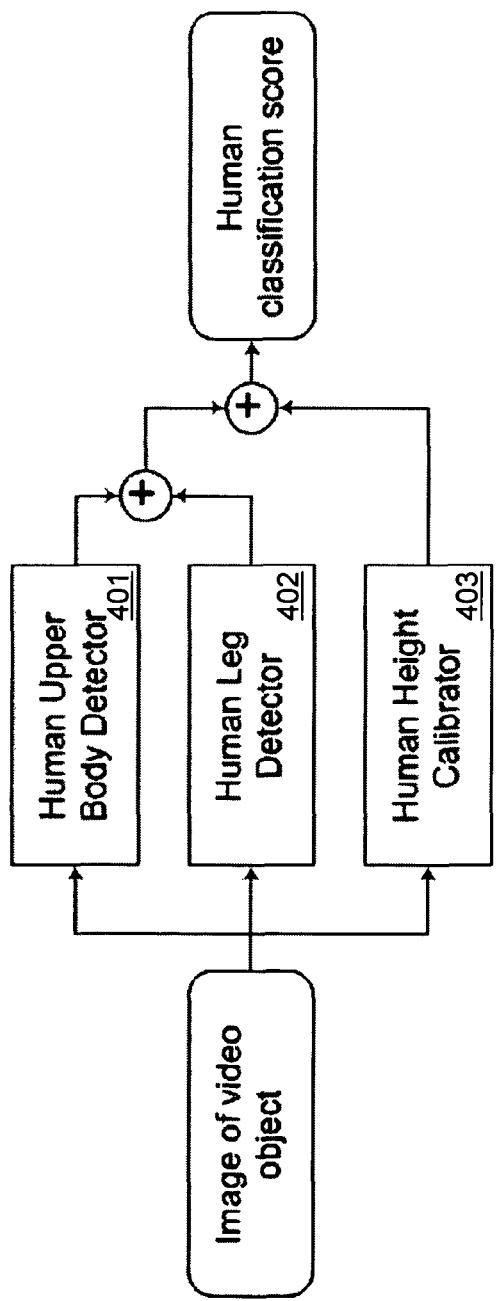
FIG. 4 illustrates the framework of the human classification rule.

Given an image of a video object, the human classification rule outputs a probability score of how likely the object is a human. FIG. 4 illustrates the framework of the human classification rule according to an embodiment of the present invention. As shown, the human classification rule includes three independent components, a human upper body detector 401, a human leg detector 402, and a human height calibrator 403.

Figure 5:
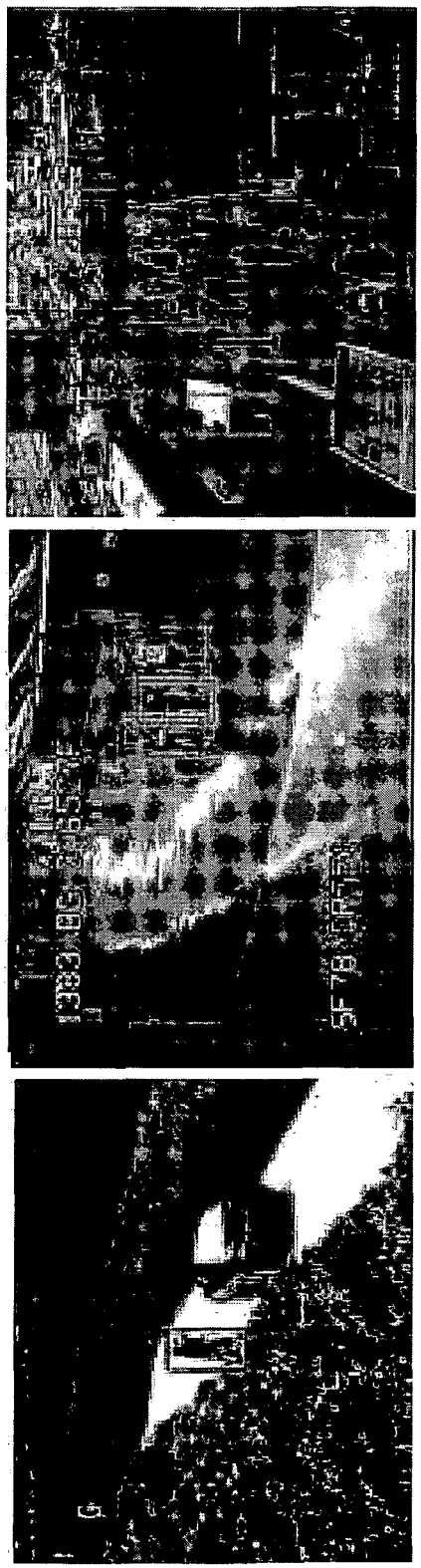
FIG. 5 illustrates results obtained by a human detector according to an embodiment of the present invention.

The human body detector is developed by learning a large number of body images. FIG. 5 illustrates results obtained by the human detector according to an embodiment of the present invention. The output of the component, denoted as $H_d$, is the sum of the detect scores on the input object image. As illustrated in FIG. 5, the bounding boxes have been extended to cover the entire human bodies.

Figure 6:
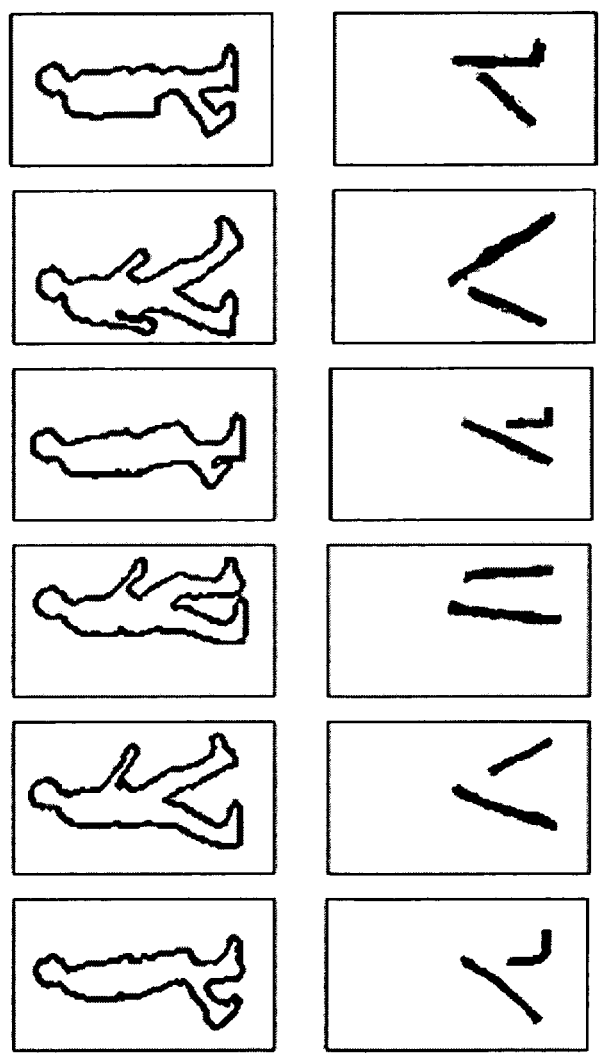
FIG. 6 illustrates leg detection examples according to an embodiment of the present invention

The leg detector first extracts the curvilinear structure of the object from the input image by using line detection. Then the leg-like line features are detected from the curvilinear structure. For example, from some prior knowledge, it is known that the leg line candidates most likely appear in the lower half of the object and has approximately vertical directions in most surveillance scenarios. FIG. 6 illustrates leg detection examples where the top lists the extracted curvilinear structures by applying the line detection to the foreground images of the input objects and the bottom is the detected leg lines according to an embodiment of the present invention. A leg detection score denoted as $H_l$ can be obtained by matching the detected leg-like line features with pre-saved leg templates.

The human height calibrator compares the pixel height of an object detected in the image plane with that of a real average person at the same location, and outputs a score according to their consistency. The height of a real person can be obtained by ground plane calibration. Let $r_h = h/\hat{h}$, where h and $\hat{h}$ denote the pixel heights of a detected object and a real person, respectively. We can obtain a human height calibration score with the following relationship.

$$H_c(r_h) = C_{a,b}(r_h) = \begin{cases} \dfrac{r_h}{a} & \text{if } r_h < a \\ \dfrac{b}{r_h} & \text{if } r_h > b \\ 1 & \text{otherwise.} \end{cases} \quad (1)$$

In the above relationship, $0<a<b$ are parameters learned from examples. It can be seen that a bigger $H_c$ value indicates a higher probability for the input object to have a human-like size.

The final human score can be obtained by fusion of the outputs of the three individual components using the score mapping function, $f_{a,b}(x)$ from relationship (31) and is shown below.

$$H_f = (w_d \cdot f_{a_d,b_d}(H_d) + (1-w_d) \cdot f_{a_l,b_l}(H_l)) \cdot (1-w_c) + H_c \cdot w_c \quad (2)$$

With respect to relationship (2), $w_d \in [0,1]$ and $w_c \in [0,1]$ are regularization parameters to balance the significance of the three component scores, and they can be learned from a set of training samples by a linear regression model.

B. Vehicle Classification Rule

Figure 7:
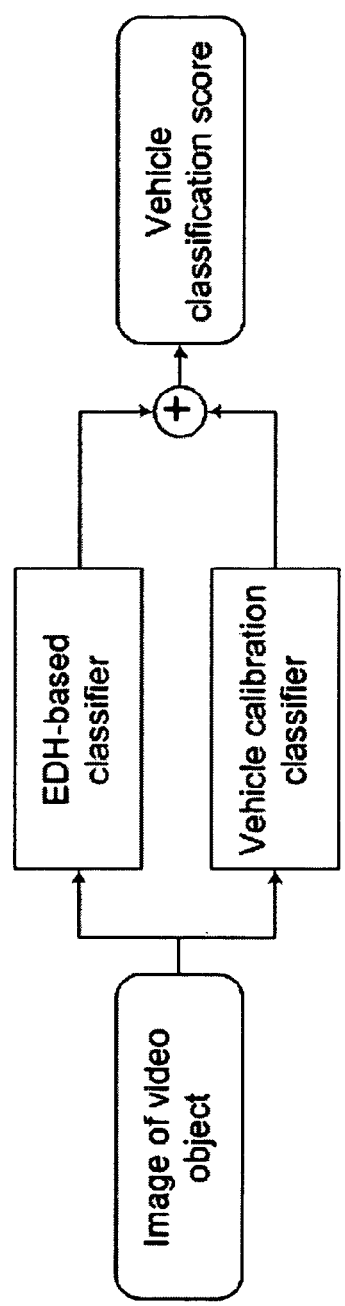
FIG. 7 illustrates a size calibration classifier according to an embodiment of the present invention.

Similar to the human classification rule, the vehicle classification rule recognizes a vehicle object. It is an ensemble classifier that includes two independent classifiers, an edge direction histogram (EDH) based classifier, and a size calibration classifier which is illustrated in FIG. 7 according to embodiment of the present invention.

Let $B_e$ be a normalized edge direction histogram built from the input image of an object. The normalized edge direction $B_e$ can be considered an N×1 vector, where N is the number of bins in the histogram covering angles from 0 to 180 degrees. Taking the vector as input, the EDH-based classifier extracts the most discriminant feature basis, $\xi$, by learning a set of vehicle and non-vehicle (mostly human) samples with linear discriminant analysis (LDA). By projection of $B_e$ onto $\xi$, we can obtain a discriminant score, where $\xi$ is an N×1 vector, and thus $V_e$ is a scalar.

$$V_e = \xi^T \cdot B_e \quad (3)$$

The vehicle size calibration classifier is similar to the one based on human height calibration. It recognizes a vehicle object by comparing the pixel size (area) of a detected object with that of a real average vehicle at the same image location. Let $s_i$ and $s_r$ denote the two sizes, respectively. A vehicle calibration score can be described as $V_c(r_s) = C_{a,b}(r_s)$, where $r_s = s_i/s_r$ and $C_{a,b}(\cdot)$ is the nonlinear mapping function defined in relationship (1).

By a linear combination of $V_e$ and $V_c$, we can derive a vehicle classification score with the following relationship where $w_e \in [0,1]$ is the regularization parameter to tradeoff the influence of the EDH and calibration classifiers.

$$V_f = w_e \cdot V_e + (1-w_e) \cdot V_c \quad (4)$$

C. Saliency Classification Rule

In a video surveillance scenario, some moving objects such as shadows, water surface, and waving tree leaves are often misclassified to be objects of a user's interest such as human being or a vehicle. Since these false objects generally appear to have no specific shape, size, and color, it is rather difficult to find feature representation for them. Compared to the real objects, one interesting observation is that a great number of false objects usually have similar appearance or texture as its surrounding or background region. Based on this observation, a set of discriminating features called saliency features is proposed as follows.

According to an embodiment of the present invention, two kinds of saliency features are considered. One is the "Color Histogram Matching Score" (CHMS) which examines the color similarity between the background/surrounding regions and the detected objects, and the other is the "Texture Matching Score" (TMS) which examines their texture or appearance similarity in the spatial frequency domain.

Figure 8:
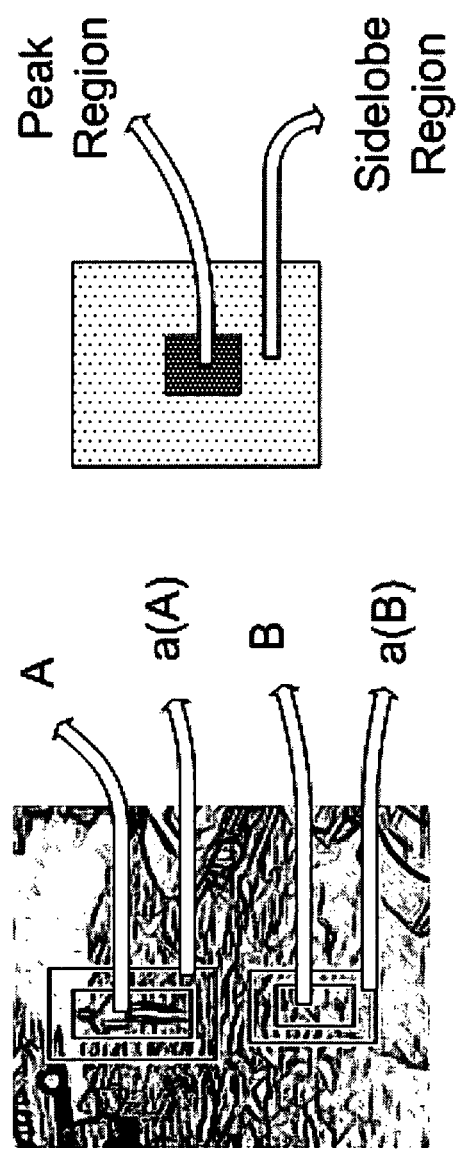
FIG. 8 illustrates examples showing regions of objects and their corresponding annular regions for histogram matching according to an embodiment of the present invention.

Let X be the bounding box of an object, and a(X) be the annular region centered on the object X, but excluding X. Two examples are shown in FIG. 8. On the left in FIGS. 8, A and B are two moving objects detected by subtracting a background model. A is a real human, and B is a false object caused due to shadow moving. The CHMS feature of X, denoted as $S_{CHMS}(X)$, is calculated by the following relationship.

$$S_{CHMS}(X) = \frac{H_x^T \cdot H_{a(x)}}{\|H_x\| \cdot \|H_{a(x)}\|} \quad (5)$$

FIG. 8 illustrates two examples to show regions of objects and their corresponding annular regions for histogram matching according to an embodiment of the present invention. On the right an example shows peak and side lobe regions for PSR calculation. On the left, we have $S_{CHMS}(A)=0.23101$, $S_{PSR}(A)=3.788$, and $S_{FS}(A)=84.8377$ for the object A, and $S_{CHMS}(A)=0.50429$, $S_{PSR}(A)=1.7487$, $S_{FS}(A)=261.1154$ for the object B.

Figure 9:
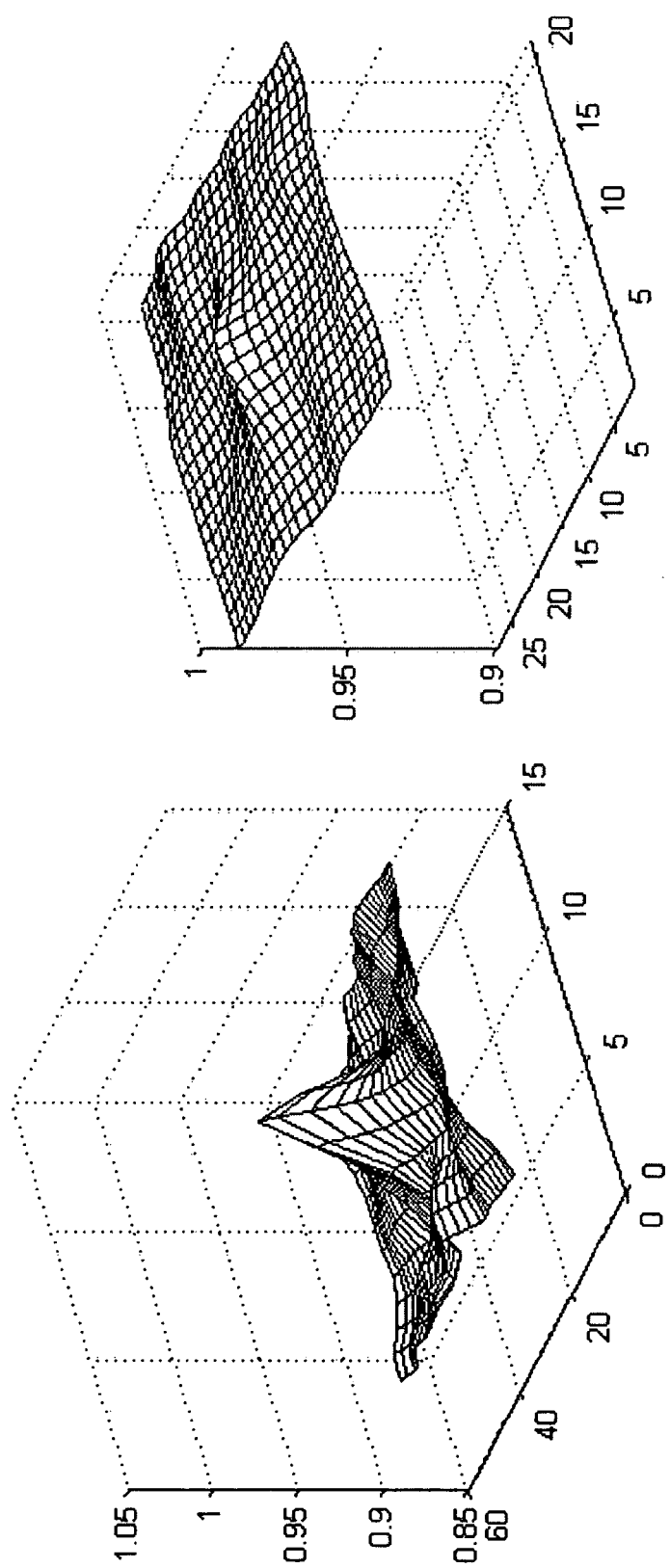
FIG. 9 illustrates a correlation map of the two examples shown in FIG. 8 according to an embodiment of the present invention.

FIG. 9 illustrates a correlation map of the two examples shown in FIG. 8. On the left the real object A is shown. On the right, the false object B is shown.

With respect to the relationship (5), $H_x$ and $H_{a(x)}$ are two $N^3 \times 1$ vectors representing the (R,G,B) color histograms of X and its annular region a(X), respectively, and N is the number of bins for each color channel.

According to an embodiment of the present invention, to calculate the TMS feature, a region is defined that extends from and centered on the object X, e(X), which unlike a(X), includes X. A correlation map between e(X) and X is then obtained by the following relationship.

$$C(x,y) = (I_X \otimes I_{e(X)})(x,y) \quad (6)$$

With reference to relationship (6), $I_X$ and $I_{e(X)}$ are the original images on the regions X and e(X), respectively, and $\otimes$ denotes the convolution operator.

In the correlation map, it can be expected to exhibit sharp, high peaks for the real objects, and no such peaks for those from background noise. FIG. 9 shows the correlation maps of the two examples of FIG. 8. On the left, the peak sharpness can be quantified by the so-called "peak-to-sidelobe ratio" (PSR).

$$S_{PSR}(X) = \frac{\overline{C}_p - \overline{C}_s}{\sigma_s} \quad (7)$$

With reference to relationship (7), $\overline{C}_p$ and $\overline{C}_s$ denote the means of C(x, y) on the peak and sidelobe regions as shown in FIG. 8 on the right. $\sigma_s$ is the standard deviation of the sidelobe region.

In addition, the flatness of the sidelobe alone is considered, which can be computed with the following relationship.

$$S_{FS}(X) = \frac{\overline{C}_s}{\sigma_s} \quad (8)$$

It has been found through experimentation that this feature may be even more discriminant than the PSR.

In video surveillance applications, a background model is often used to detect foreground objects. Thus, similar to the original foreground image, I(x, y), we can also extract the CHMS and TMS features from an object and its corresponding background image, G(x, y). For the distinguishing purpose, we denotes saliency features as $S^I(X)$ and $S^G(X)$ obtained from I(x, y) and G(x, y), respectively. Furthermore, it has been found through experimentation that the ratio of $S^G_{FS}(X)/S^I_{FS}(X)$ for a real object tends to be much bigger compared to a noise object. On the other hand, a noise object usually exhibits a higher color similarity to its annular and background regions. As a result by fusion of the two features, a more discriminant saliency score can be derived as shown below.

$$S_f(X) = w_s \cdot f_{a_s,b_s}\left(\frac{S^G_{FS}(X)}{S^I_{FS}(X)}\right) + (1 - w_s) \cdot g_{a_c,b_c}(S^G_{CHMS}(X) + S^I_{CHMS}(X)) \quad (9)$$

With regard to relationship (9), $f_{a_s,b_s}(\cdot)$ and $g_{a_c,b_c}(\cdot)$ are the increasing and decreasing score mapping functions defined in relationships 31,32, respectively, and $w_s$ is a regularization parameter to tradeoff the significance of the correlation and histogram matching scores. In general, a larger $S_f(X)$ value indicates a higher probability of being a true object.

D. Trajectory Classification Rule

Motion trajectory has been shown to be a significant attribute in many pattern recognition tasks such as video object retrieval and human gesture recognition. In video surveillance, a real object generally moves in a more continuous and smoother track compared to a noise object. Thus, from the motion trajectories we can extract effective discriminant features to exclude noise objects or unwanted objected such as a swinging flag.

A motion trajectory can be mathematically represented as a parametric curve $(x(t),y(t)), t\in[t1,t2]$ in the two-dimensional image plane. Since the raw trajectory is often noisy due to imperfect tracking, the trajectory is smoothed with a Gaussian low pass filter $G_o(t)$.

$$\begin{cases} \hat{x}(t) = (G_\sigma \otimes x)(t) \\ \hat{y}(t) = (G_\sigma \otimes y)(t) \end{cases} \quad (10)$$

Let $c^0(t)=[\hat{x}^0(t),\hat{y}^0(t)]$ be the first derivative of $(\hat{x}(t),\hat{y}(t))$. The consistency of two neighboring points on the curve $(\hat{x}(t), \hat{y}(t))$ can be measured by the following.

$$\begin{cases} \hat{x}(t) = (G_\sigma \otimes x)(t) \\ \hat{y}(t) = (G_\sigma \otimes y)(t) \end{cases} \quad (10)$$

Given a temporal window $t\in[t_1, t_2]$, a smoothness feature can be derived from l(t) as shown below.

$$T_{sm} = \frac{1}{\sigma_l \cdot (t_2 - t_1)} \sum_t l(t) \quad (12)$$

With respect to relationship (12), $\sigma_l$ is the standard deviation of l(t), $t\in[t_1,t_2]$.

Also, the curvature is one of the important characteristics to describe a curve. It generally produces a higher curvature value for an irregular motion trajectory, which indicates a noise object for a high probability. The curvature feature of the curve $(\hat{x}(t),\hat{y}(t))$ can be computed with the following relationship.

$$T_{cv} = \frac{1}{t_2 - t_1} \sum_t \frac{|x'(t)y''(t) - x''(t)y'(t)|}{(x'^2(t) + y'^2(t))^{\frac{3}{2}}} \quad (13)$$

With respect to relationship (13), $(\hat{x}^{00}(t),\hat{y}^{00}(t))$, is the second derivative of $(\hat{x}(t), \hat{y}(t))$.

Figure 10:
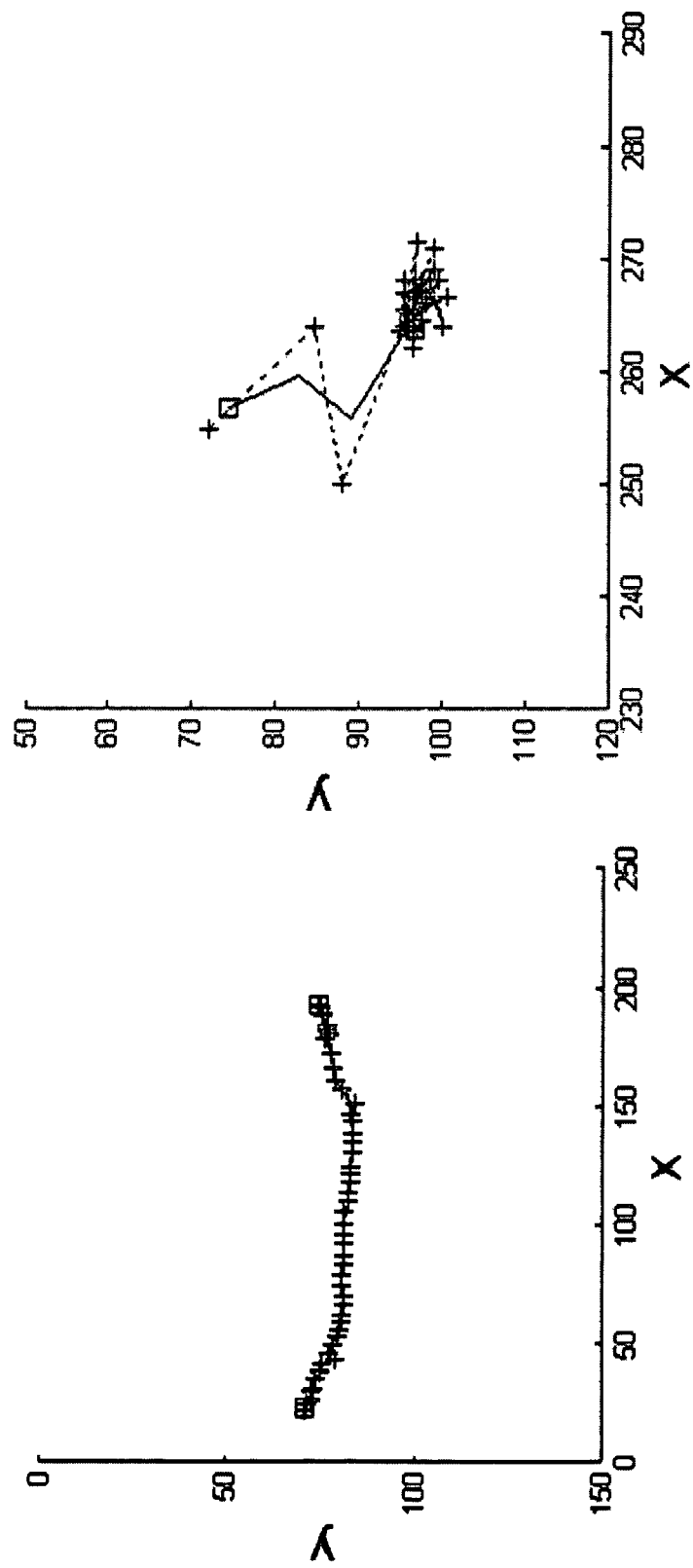
FIG. 10 illustrates a trajectory example of a vehicle object and a noise object according to an exemplary embodiment of the present invention.

FIG. 10 illustrates on the left a trajectory example of a vehicle object, which has $T_{sm}$=121.9187 and $T_{cv}$=0.038471. On the right, FIG. 10 illustrates a trajectory example of a noise object, which has $T_{sm}$=0.38863 and $T_{cv}$=13.693. The effectiveness of the two trajectory features can be seen from the two examples, where $T_{sm}$=121.9187 and $T_{cv}$=0.038471 are obtained for a vehicle object, and $T_{sm}$=0.38863 and $T_{cv}$=13.693 for a noise object. Furthermore, using the mapping functions $f_{a,b}(x)$ and $g_{a,b}(x)$, a trajectory score can be obtained by the fusion of the two smoothness and curvature features as shown with the relationship below.

$$T_f = f_{a_m,b_m}(T_{sm}) \cdot g_{a_v,b_v}(T_{cv}) \quad (14)$$

As shown, a bigger $T_f$ value represents a more flat and smooth curve, which is more likely to be the trajectory of a true object.

Figure 11:
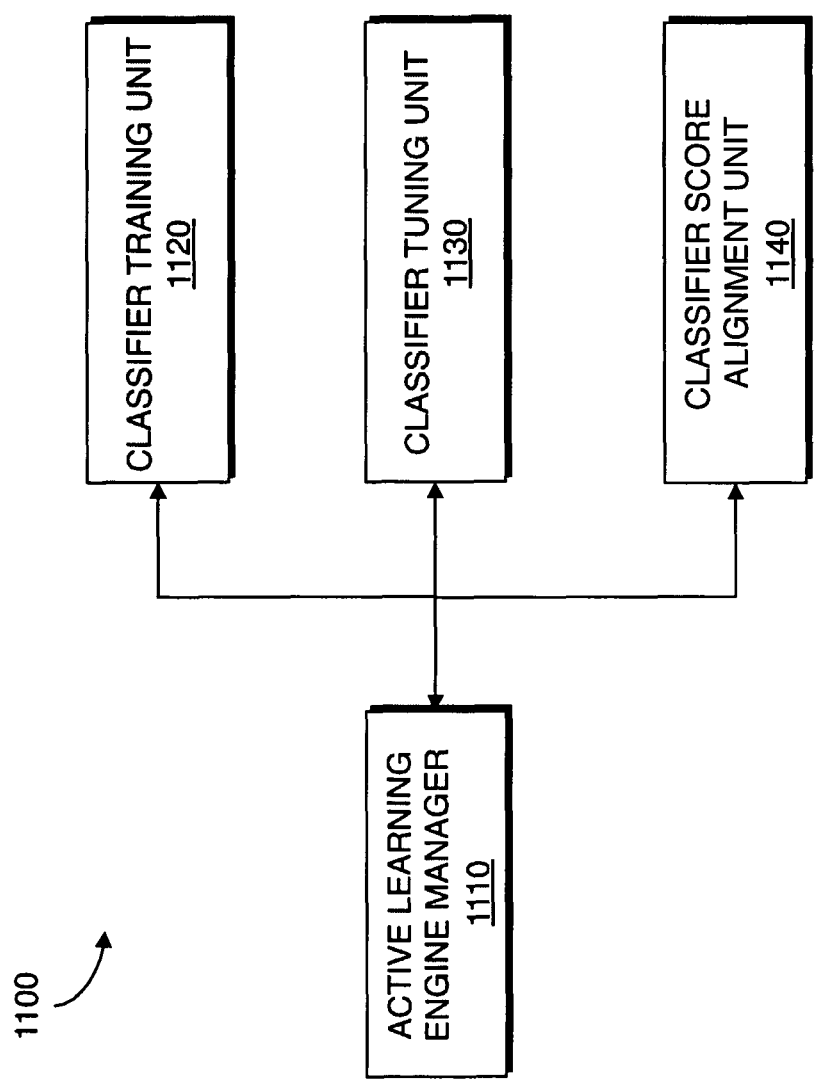
FIG. 11 illustrates a block diagram of an active learning engine 1100 according to an exemplary embodiment of the present invention.

FIG. 11 illustrates a block diagram of an active learning engine 1100 according to an exemplary embodiment of the present invention. The active learning engine 1100 may be used to implement the active learning engine 140 illustrated in FIG. 1. The active learning engine 1100 may be used to automatically tune a surveillance system so that its operation improves for a specific environment and still maintains the quality of performance (average performance) for a general environment. The active learning engine 1100 achieves this by creating event classifiers using feedback, from users and/or other detection modules and/or other algorithms, and feature data associated with events or other system statistics, from on-line or off-line data sets.

The active learning engine 1100 includes an active learning engine manager 1110. The active learning engine manager 1110 is connected to and transmits data between the components of the active learning engine 1100.

The active learning engine 1100 includes a classifier training unit 1120. According to an embodiment of the present invention, the classifier training unit 1120 collects an on-line data set. The on-line data set may originate from video data from one or more video cameras on the surveillance system. The video data may be processed by a video analytic engine to include events and feature data. The classifier training unit 1120 may also collect feedback on the events from users or other detection modules or algorithms as well as collect an off-line data set.

The active learning engine 1100 includes a classifier tuning unit 1130. According to an embodiment of the present invention, the classifier tuning unit 1130 operates to factor in an expected error detection objectives into the event classifier created.

Figure 12:
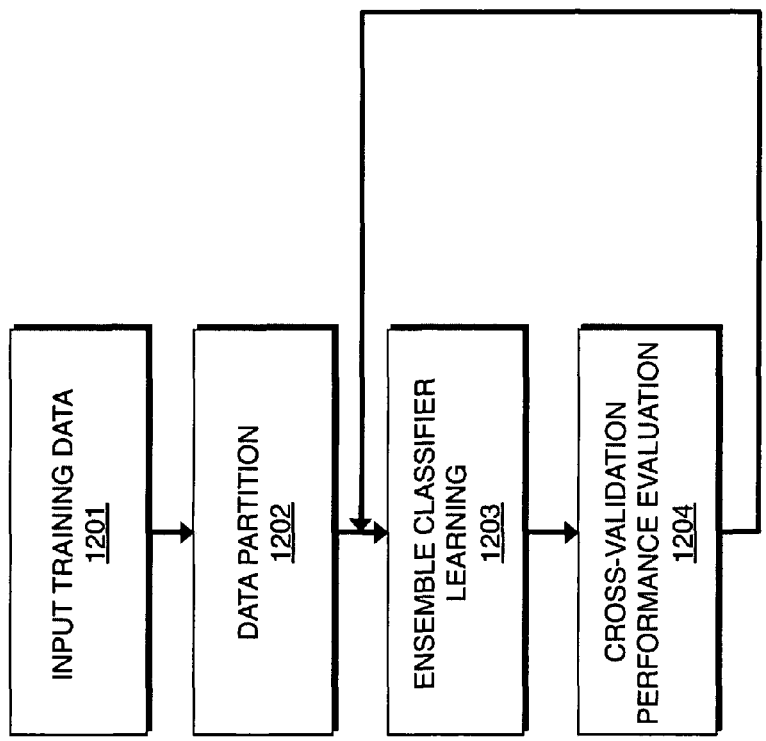
FIG. 12 is a flow chart illustrating classifier training according to an exemplary embodiment of the present invention.

The active learning engine 1100 includes a classifier score alignment unit 1140. According to an embodiment of the present invention, the classifier score alignment unit 1140 performs a score normalization procedure on confidence scores of the event classifiers that maps outputs of different event classifiers to a common domain without compromising the performance of any individual event classifier. In the common domain, there is a same standard of measurement for all the event classifiers which allows for the results of the event classifiers to be compared. The event classifiers may be also be tuned to a single threshold FIG. 12 is a flow chart illustrating classifier training according to an exemplary embodiment of the present invention. The procedure illustrated in FIG. 12 may be performed by the classifier training unit 1120 to create an event classifier. At 1201, training data is inputted. According to an embodiment of the present invention, the training data may include the on-line and off-line data set and feedback collected.

At 1202, the training data is partitioned into groups. According to an embodiment of the present invention, the training data is duplicated to K groups with different partitions. The partitions may follow a standard K-fold cross-validation method. Each group includes a training set and a validation set. There is no overlap between the two sets.

At 1203, ensemble classifier learning is performed. According to an embodiment of the present invention, a classifier is trained with a classification error returned from previous iteration for each group. There are K classifiers for the K groups.

At 1204, cross-validation performance evaluation is performed. According to an embodiment of the present invention, the K classifiers obtained are applied to their corresponding K validation sets, respectively. Their classification errors are aggregated to obtain an overall error. The overall error is used by a learning stop criterion. The learning stops if the criterion is satisfied, and returns to 1203 with all the classification errors otherwise.

Figure 13:
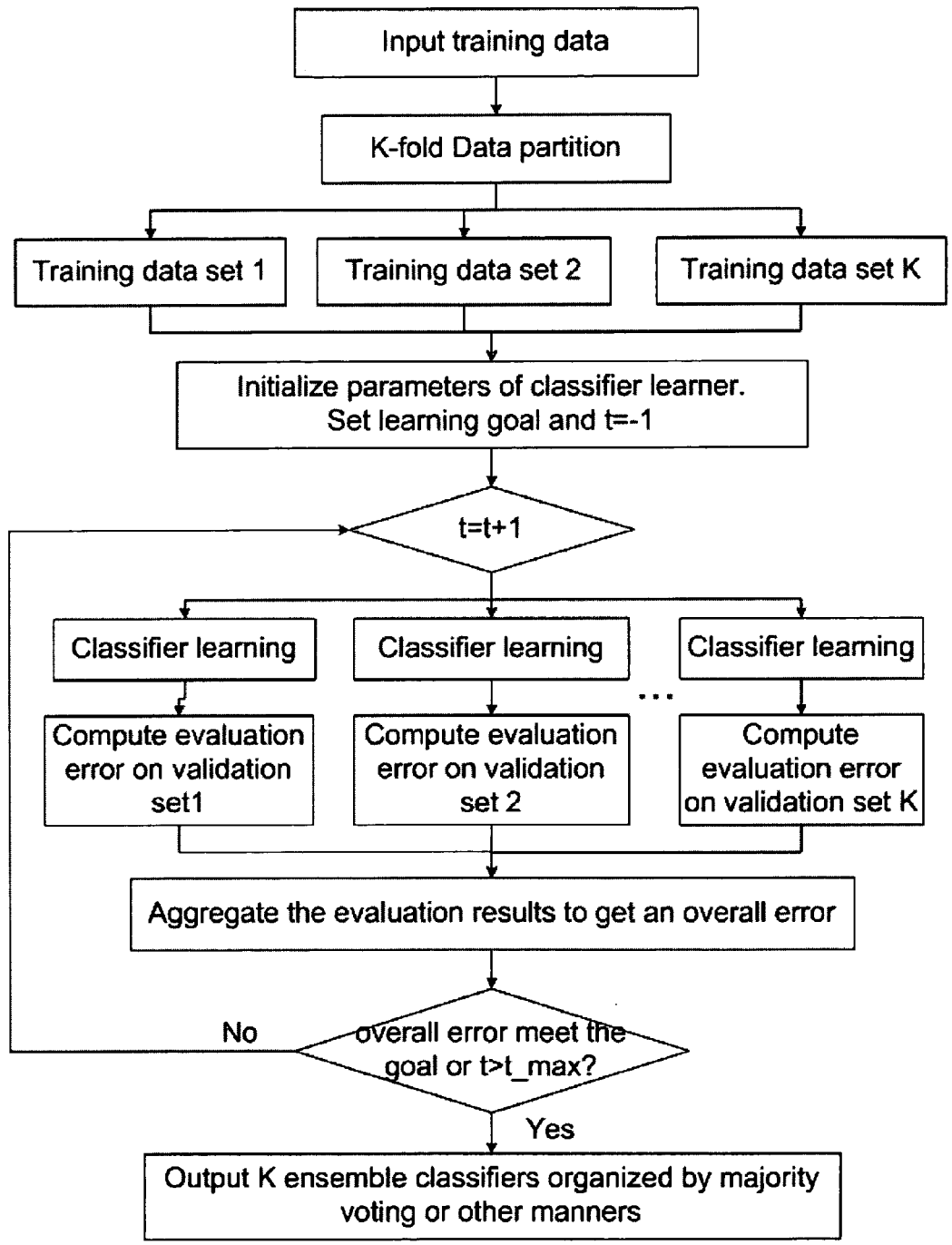
FIG. 13 illustrates a detailed implementation of the classifier training procedure illustrated in FIG. 12.

FIG. 13 illustrates a detailed implementation of the classifier training procedure illustrated in FIG. 12 according to an embodiment of the present invention.

Figure 14:
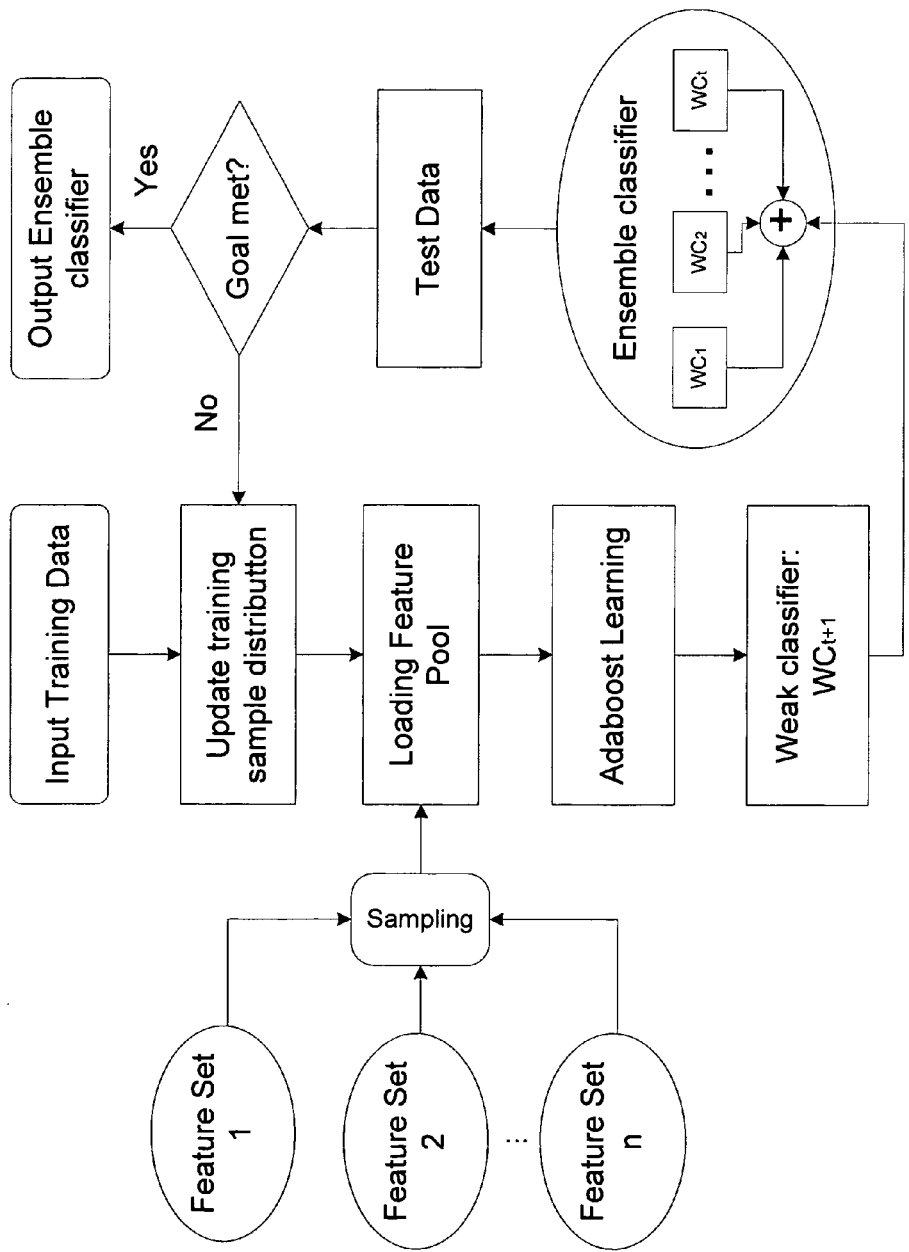
FIG. 14 illustrates a detailed implementation of ensemble classifier learning.

FIG. 14 illustrates a detailed implementation of ensemble classifier learning according to an embodiment of the present invention. The procedure illustrated in FIG. 14 may be used to implement 1203 of FIG. 12. As shown, an Adaboost-based learning procedure is implemented. Given a training data set, the Adaboost-based learning system works by repeatedly applying a given weaker learner to a weighted version of the training data set in a series of rounds t=1, . . . T, and then linearly combining these weak classifiers $\{WC\}_{t=1}^{T}$ constructed in each round into a single strong ensemble classifier, which could be arbitrarily accurate in theory. A feature of this technique is its ability to reduce the amount of over fitting and the generalization error of classification, even as T becomes larger.

The raw feature data in the on-line and off-line data sets may need to be further processed to create final features for classifier learning. According to an embodiment of the present invention, a feature extraction procedure will use the images in the feature data to create additional features related to the images. Those image features may be general and are not behavior (or analytic engine) specific. In the example of event filtering for perimeter intrusion, there are three sets of features used. The first feature set is the RBC feature set $\Xi_{RBC}$.

$$\Xi_{RBC} = \begin{Bmatrix} H_d, H_l, H_c, H_f, V_e, V_c, V_f, S^G_{CHMS}, S^G_{FS}, S^G_{PSR}, \\ S^l_{CHMS}, S^l_{FS}, S^l_{PSR}, S_f, T_{sm}, T_{cv}, T_f \end{Bmatrix} \quad (15)$$

The second set of features, denoted as $\Xi_{Haar}$, includes the "Haar-like" features which have been proved to be very successful in many pattern recognition applications such as object detection.

FIG. 15 illustrates four prototype templates of the rectangular Haar wavelet like features on the left according to an embodiment of the present invention. Each of the features takes a scalar value obtained by a linearly weighted combination of the pixel sums of the "positive" (light gray) and "negative" (dark gray) rectangles. For an upper human body example of size 24×32, one can generalize tens of thousands of scalar features by varying the location, width, and height of each template. The feature number is much larger than the dimensionality of the pattern, 768, resulting in an over-complete set of scalar features. To represent an intrinsically low-dimensional object pattern such as human body, it only needs a very small fraction of the set, which can be found efficiently by using the Adaboost learning method. FIG. 15 illustrates an example of the most discriminant Haar-like feature found by AdaBoost learning for the human upper body pattern on the left.

A third feature set, denoted as $\Xi_{LBP}$, comes from a "Local Binary Pattern" (LBP) (also referred to as a "Census Transform"). The LBP feature captures the local spatial structure of an image by binary comparisons of pixel intensities between a block $A_0$ and its eight surrounding blocks $A_1 \ldots A_8$ in a 3×3 kernel depicted in FIG. 16 on the left. The result is grouped to form a binary string (LBP code) in a pre-defined order. The LBP feature corresponding to the block $A_0$ is the decimal form of the 8-bit binary string (a number $\in [0, 255]$), which is invariant to monotonic gray-scale transformations. Thus, the LBP feature is stronger against illumination variations compared to the Haar-like features. This can be seen at this point from the exemplary examples shown in FIG. 16 on the right. FIG. 16 on the right illustrates two examples of multi-scale LBP feature extraction. Shown from left to right are the original images, and LBP feature maps with scales 1, 3, 5, and 9. The case of scale=1 is equivalent to the basic LBP. In the basic LBP operator, block $A_i$ is a single pixel. This feature is sensitive to noise and weak in capturing large or global spatial structure. To overcome the shortcomings, a multi-scale LBP, which extends $A_i$ to a n×n block from a single pixel is generated. According to an embodiment of the present invention, a multi-resolution solution is used to extract LBP features of 5 scales, n=1, 3, 5, 9, 15. From the LBP features, a histogram of up to 256 bins can be built for each scale. The bin values of the histograms constitute the feature pool, $\Xi_{LBP}$, used in the AdaBoost learning.

The LBP-based features have been shown to be very successful in various pattern recognition applications. However, it can be seen that the illumination invariant effect is reached by weakening the contrast of locally neighboring pixels, which may include significant discriminant information for some object patterns. On the other hand, the Haar-like features may work well at this point. These two kinds of features may offer complementary information to each other in a joint learning framework. According to an embodiment of the present invention, Haar and LBP features may be introduced to capture additional discriminant information missed by the raw feature data, such as RBC features in perimeter intrusion case. Considering most samples that need to be filtered or need to be correctly classified are those previously failed, it is particularly important to have extra features, which are capable of extracting new significant discriminant information. In addition, both the Haar and LBP features can be computed very efficiently by an integral image or a summed-area table. It ensures the classifiers created with the two features to be able to work in real-time systems.

The final feature sets (the three feature set, $\Xi=\{\Xi RBC, \Xi Haar, \Xi LBP\}$, in the case of perimeter intrusion example) constitute an over-complete scalar feature set. It may be difficult to compute the entire scalar feature set. However, only a small fraction of the set is needed to represent an intrinsically low-dimensional object pattern such as human body or vehicle. The most significant features can be found efficiently by using the Adaboost learning method.

A set of N labeled training examples is given as (x1, y1), ..., (xN,yN), where $yj \in \{+1,-1\}$ is the class label for the example $xj \in R^n$. AdaBoost assumes that a procedure is available for learning sequence of weak classifiers $h_m(x)$ (m=1, 2, ..., M) from the jtraining examples, with respect to the distributions $w^{(m)}$ of the examples. A weak classifier $h_m(x)$ is a stump classifier associated with a single scalar feature $f_i$. Thus, to find the best new weak classifier is equivalent to choosing the best corresponding scalar feature. A stronger classifier is a linear combination of the T weak classifiers as shown in the relationship below.

$$H(x) = \sum_{t=1}^{T} h_t(x) - \theta_b \quad (16)$$

With respect to relationship (16), $\theta_b$ is a threshold controlling the tradeoff of detect rate and false positive. The classification of x is obtained by $\hat{y}(x)=\text{sign}[H(x)]$ and the normalized confidence score is $|H(x)|$. The original form of $h_m(x)$ is a discrete function [10]. According to an embodiment of the present invention, the gentle AdaBoost is used to minimize the following weighted least square error.

$$E = \sum_{j=1}^{N} w_j (h_m(f_i, x_j) - y_j)^2 \quad (17)$$

where $$h_m(f_i, x_j) = \begin{cases} v_i, & \text{if } f_i \geq \theta_i \\ \mu_i, & \text{otherwise} \end{cases} \text{ with } v_i, \mu_i \in [-1, 1]. \quad (18)$$

$$v_i = \frac{W_+^r - W_-^r}{W_+^r + W_-^r} \quad (19)$$

$$\mu_i = \frac{W_+^l - W_-^l}{W_+^l + W_-^l} \quad (20)$$

$$W_+^r = \sum_{j:(y_j=1)\&(f_i(x_j)\geq\theta_i)} w_j \quad (21)$$

$$W_-^r = \sum_{j:(y_j=-1)\&(f_i(x_j)\geq\theta_i)} w_j \quad (22)$$

$$W_+^l = \sum_{j:(y_j=1)\&(f_i(x_j)<\theta_i)} w_j \quad (23)$$

$$W_-^l = \sum_{j:(y_j=-1)\&(f_i(x_j)<\theta_i)} w_j \quad (24)$$

The optimal parameters of $h_m$ together with the best feature f* can be determined by minimizing the error of relationship (17).

$$f_* = \underset{f_i \in \Xi}{\operatorname{argmin}} E(f_i) \quad (25)$$

During AdaBoost learning, each iteration selects the best feature f* from the entire set, $\Xi$. Since the set $\Xi$ includes several different feature sets ($\{\Xi RBC, \Xi Haar, \Xi LBP\}$, one possible problem with such a procedure is that one kind of features is over-selected and that other features are ignored. This may dramatically increase the over fitting chance, particularly when the size of the on-line training sample (data set) is small. To avoid this problem, a feature sampling mechanism is introduced as illustrated in FIG. 14. Let $\Xi_1, \Xi_2, ..., \Xi_n$ be n independent feature pools. In each iteration, a feature pool is randomly selected at a sampling rate of $\alpha_1, \alpha_2, ... \alpha_n$, corresponding to the n feature pools, respectively. The sampling is subject to a uniform distribution and satisfying $\alpha 1+\alpha_2+ ... +\alpha_n=1$. Let $\Xi^*$ be the selected feature pool. Instead of using relationship (26), the best feature f* can be found by using the following relationship.

$$f_* = \underset{f_i \in \Xi^*}{\operatorname{argmin}} E(f_i) \quad (26)$$

The sampling rates $\alpha\{\cdot\}$ for each feature pool are determined by their respective significance for the classification task. They can be learned from the individual classification performance of each feature pool on a representative off-line training set. For example, let $\epsilon(\cdot)$ denote the obtained error rate, and $C=1-\epsilon$. A simple method to get the sampling rate is shown below.

$$\alpha_i = \frac{C_i}{\sum_{j=1...n} C_j}, i = 1 ... n \quad (27)$$

The event classifier may be trained by using the learning procedure illustrated in FIG. 14. The learning procedure involves two data sets. The first set is the on-line data set, denoted D, which is collected in a new installation environment. The second is the off-line set, denoted F, which is a generic data set that includes only positive patterns collected from environments outside the new installation environment. The off-line data set may be provided by the surveillance system developer and may cover other most representative variations of patterns. The purpose of introducing the off-line data set is to ensure the generalization ability of the event classifiers created.

In addition to the feature selection, there are several parameters that are automatically determined during AdaBoost learning. The parameters include 1) the number of weak classifiers T, and 2) the threshold of ensemble classifiers θ. These are determined by examining the tradeoff between miss rate and false rate. According to an embodiment of the present invention, it is particularly important for the event classifiers to have a high detect rate to avoid missing detection of suspicious objects. Thus the learning objective is specifically aimed to minimize the false rate subject to ζ≤ζg, where ζ denotes the missing rate, and ζg is a preset target (e.g. ζg=5%). The specific objective is a more difficult learning task than simply minimizing the overall error rate of the entire set. The former requires a more accurate estimate of the generalization error.

According to an embodiment of the present invention, a K fold ensemble cross-validation (ECV) learning scheme as shown in FIG. 13 is utilized. Let $D^+$ and $D^-$ be the on-line positive and negative sample sets, respectively with $D=D^++D^-$. First a data partition procedure is conducted for the following ECV purposes.

$D^+$ is evenly split into K groups: $D^+_k$, k=1~K.
$D^-$ is evenly split into K groups: $D^-_k$, k=1~K.
F is evenly split into K groups: $F_k$, k=1~K.

In the k-th ECV step, the following training and validation sets are created.

The training set $T_k=T_k^{on}+T_k^{of}$ includes the on-line data set $T_k^{on}=(D^+-D^+_k)+(D^--D^-_k)$ and the
off-line data set $T_k^{of}=F-F_k*T_k$ is used to train an ensemble classifier, $H_k$....

The validation set $V_k=V_k^{on}+V_k^{of}$ consists of the on-line data set $V_k^{on}=D^+_k+D^-_k$ and the off-line
data set $V_k^{of}=F_k*V_k$ is used to estimate the error of the trained ensemble classifier, $H_k$....

The ECV process creates K ensemble-based classifiers $H(T, \theta)=\{H_k(T, \theta)\}^K_{k=1}$ in parallel. Each classifier could be learned by but not limited to the Adaboost-based training method as shown in FIG. 14. In every iteration of AdaBoost, the overall error of the K classifier ensemble H(T, θ) evaluated with individual component classifier $H_k(T, \theta)$ on its corresponding validation set are used to determine the model parameters, i.e. the optimal weak classifier number $T_\square$ and ensemble classifier threshold $\theta_\square$. In realistic applications, the on-line sample number is often not comparable to the off-line one. This may result in a problem that the obtained ensemble classifiers are over-focused on either on-line or off-line samples. To avoid this problem, a regularized overall error is introduced as shown in the relationship below.

$$Q_t=\lambda*Q_t^{on}+(1-\lambda)*Q_t^{of} \quad (28)$$

With respect to relationship (28), where $Q_t^{on}$ and $Q_t^{of}$ denote errors obtained from on-line and off-line samples, respectively, and λ∈[0,1] is a regularization parameter to balance the influence of the two kinds of samples on ensemble classifier training.

An exemplary implementation of the ECV learning scheme is shown in pseudo code in FIG. 17. FIG. 18 illustrates a pseudo code implementation of the function Er(H, L), which computes the ECV classification error according to an embodiment of the present invention. The obtained classifier ensemble $H_*=\{H_k\}^K_{k=1}$ can be applied with some combination rules such as majority voting and random picking.

FIG. 19 is a flow chart illustrating a classifier tuning procedure according to an embodiment of the present invention. The classifier tuning procedure illustrated in FIG. 19 may be implemented by the classifier tuning unit 1130 illustrated in FIG. 11.

Figure 20:
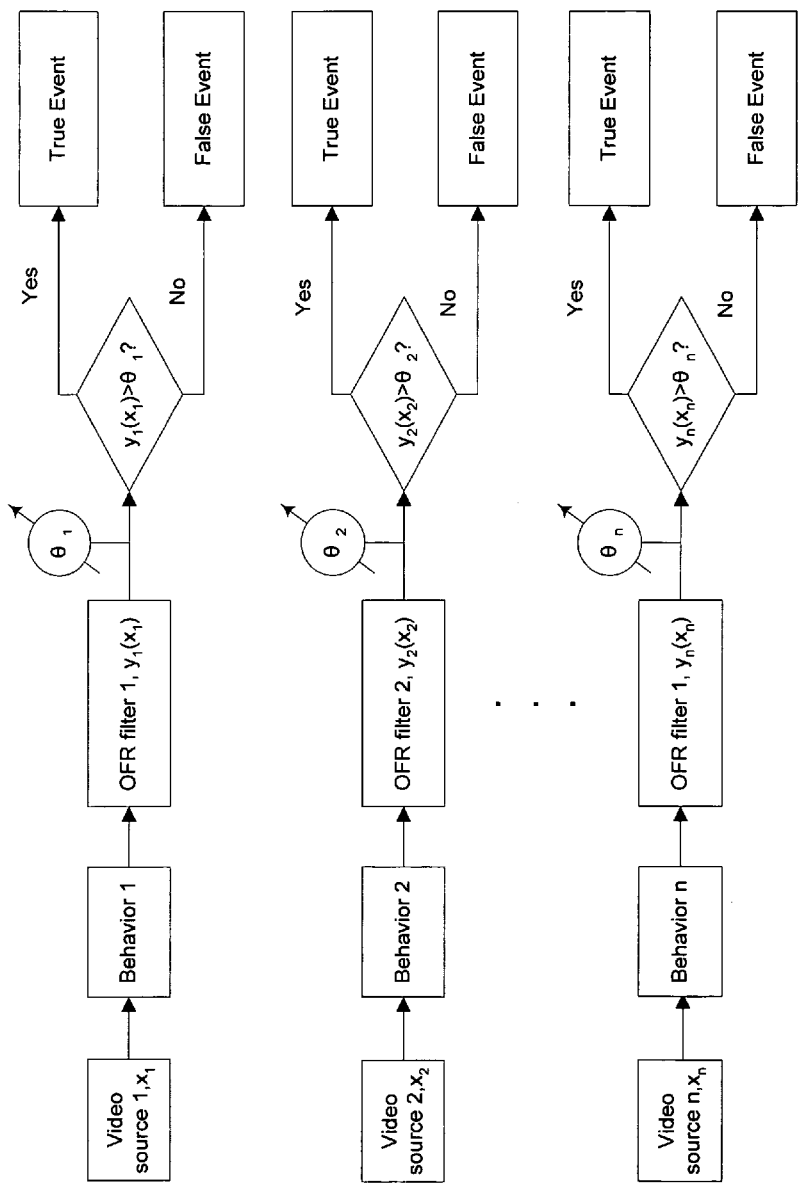
FIG. 20 illustrates a procedure for tuning thresholds for event classifiers according to an embodiment of the present invention.
Figure 21:
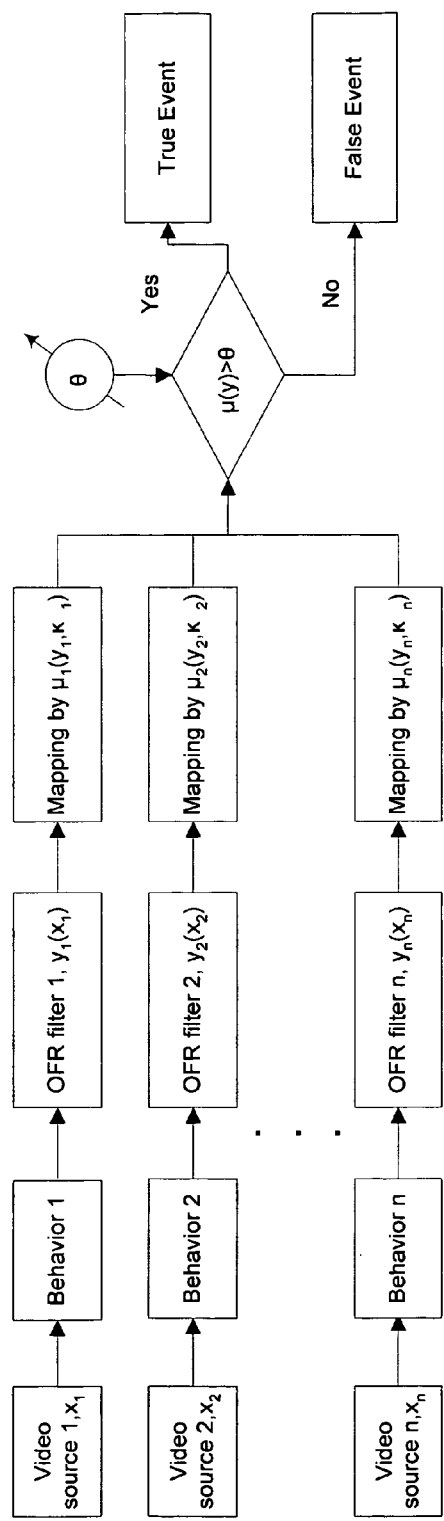
FIG. 21 illustrates a tuning procedure according to an alternative embodiment of the present invention.

Referring back to FIG. 11, the active learning engine 1100 may create several event classifiers for different video cameras or behaviors for its surveillance system. The threshold for each event classifier is typically different. In order to achieve a common performance goal, such as a missed detection rate, the thresholds for the event classifiers may need to be tuned by the classifier score alignment unit 1140. Tuning thresholds for event classifiers may be challenging as illustrated by the event classifier tuning procedure illustrated in FIG. 20. It may also be challenging to compare results from different event classifiers since their outputs generally fall within different ranges. According to an embodiment of the present invention, the classifier score alignment unit 1140 performs a score normalization procedure that maps outputs of different event classifiers to a common domain without compromising the performance of any individual event classifier. In the common domain, there is a same measurement for all the event classifiers which allows for the results of the event classifiers to be compared. The event classifiers may be also be tuned to a single threshold. FIG. 21 illustrates a tuning procedure according to an exemplary embodiment of the present invention. The tuning procedure illustrated in FIG. 21 may be performed by the classifier score alignment unit 1140 (shown in FIG. 11).

Figure 22:
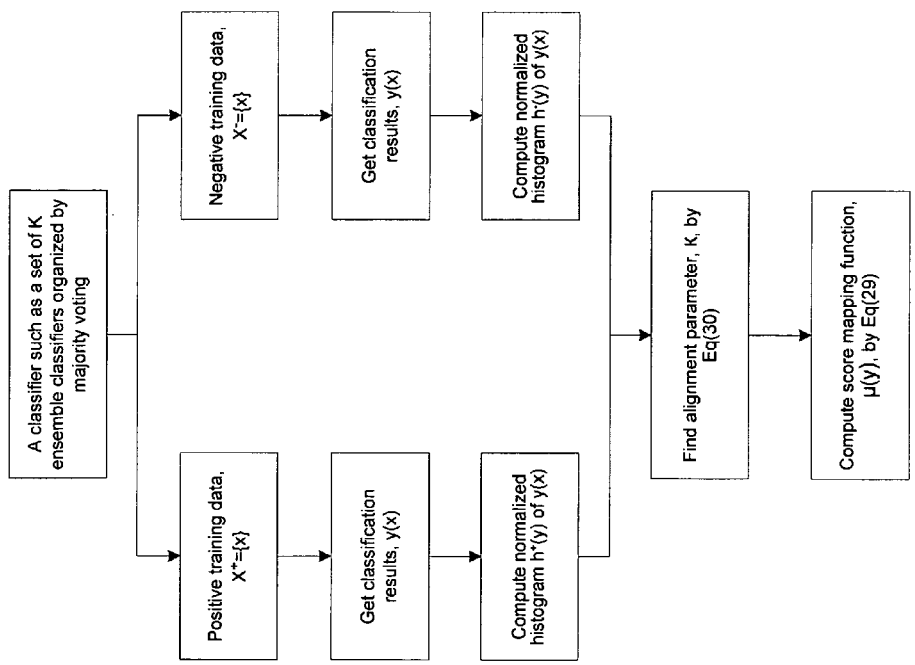
FIG. 22 is a flow chart illustrating a method for performing score mapping according to an embodiment of the present invention.

FIG. 22 is a flow chart illustrating a method for performing score mapping according to an embodiment of the present invention. The method illustrated in FIG. 22 may be performed by the classifier score alignment unit 1140 (shown in FIG. 11). Let H be a filter and X be the tuning data set to build the filter. First, H is applied to X to get the classification results Y=H(X). A histogram h(y) may be built from Y. h(y) is normalized to have $\int^{+\infty}_{-\infty}h(y)=1$. Let $h^+(y)$ and $h^-(y)$ denote histograms from positive and negative samples, respectively. We introduce a confidence score, μ(y)∈[0, 1], which is expressed in the following relationship.

$$\mu(y)=[\kappa*\int^y_{-\infty}\hbar^+(t)dt]/[\kappa*\int^y_{-\infty}\hbar^+(t)dt+\int^{+\infty}_y\hbar^{-h^-}(t)dt] \quad (29)$$

With respect to relationship (29), K≥0 is a parameter to align thresholds of different filters. $\int^y_{-\infty}h^+(t)dt$ and $\int^{+\infty}_y h^-(t)dt$ are the m missing and false rates when the threshold classifier H(X) is set as set as $\theta_\infty=t$, respectively. The score μ(y) reflects the confidence of a filter classifying a positive sample. Also, although nonlinear, the mapping from y to μ is monotonous. This ensures that the mapping does not sacrifice the performance of any individual filter.

In the ECV learning process described, the threshold $\theta_\infty$ of any one individual filter H is tuned so that the missing rate of the filter is around $\zeta_g$. The $\theta_\infty$ values differ for different filters. Thus, the filters have to be aligned so that they have a common threshold (denoted as τ∈[0, 1]) in the confidence score domain. Such an alignment can be realized by setting the following relationship for filter H.

$$\kappa = \frac{\tau}{1-\tau} \cdot \frac{\int_{\theta_*}^{+\infty} \hbar^-(t)\,dt}{\int_{-\infty}^{\theta_*} \hbar^+(t)\,dt} \quad (30)$$

According to an embodiment of the relationship, all the filters have the same missing rate at ζg at μ=τ after the mapping μ(y). As a result, the task of threshold tuning can be done simply by adjusting the τ value rather than tuning the individual threshold of every filter. This dramatically simplifies the task of tuning the overall system performance, and also makes outputs of different filters comparable regardless of the characteristics of individual classifier.

For fusion of multiple features, two score mapping functions $f_{a,b}(x)$ and $g_{a,b}(x)$ are introduced and expressed in the following relationships.

$$f_{a,b}(x) = \begin{cases} 0 & \text{if } x < a \\ (x-a)/(b-a) & \text{if } a \le x \le b \\ 1 & \text{if } x > b \end{cases} \quad (31)$$

$$g_{a,b}(x) = \begin{cases} 1 & \text{if } x < a \\ (b-x)/(b-a) & \text{if } a \le x \le b \\ 0 & \text{if } x > b \end{cases} \quad (32)$$

With respect to relationships (31) and (32), $f_{a,b}(x)$ is an increasing function, and $g_{a,b}(x)$ is a decreasing score mapping function. The two functions are used to map features with different ranges to [0, 1], so that they can be fused together for an enhanced discriminant feature score.

FIGS. 2, 12-14, and 19-22 are flow charts that illustrate embodiments of the present invention. Some of the techniques illustrated may be performed sequentially, in parallel or in an order other than that which is described and that the procedures described may be repeated. It should be appreciated that not all of the techniques described are required to be performed, that additional techniques may be added, and that some of the illustrated techniques may be substituted with other techniques.

Figure 23:
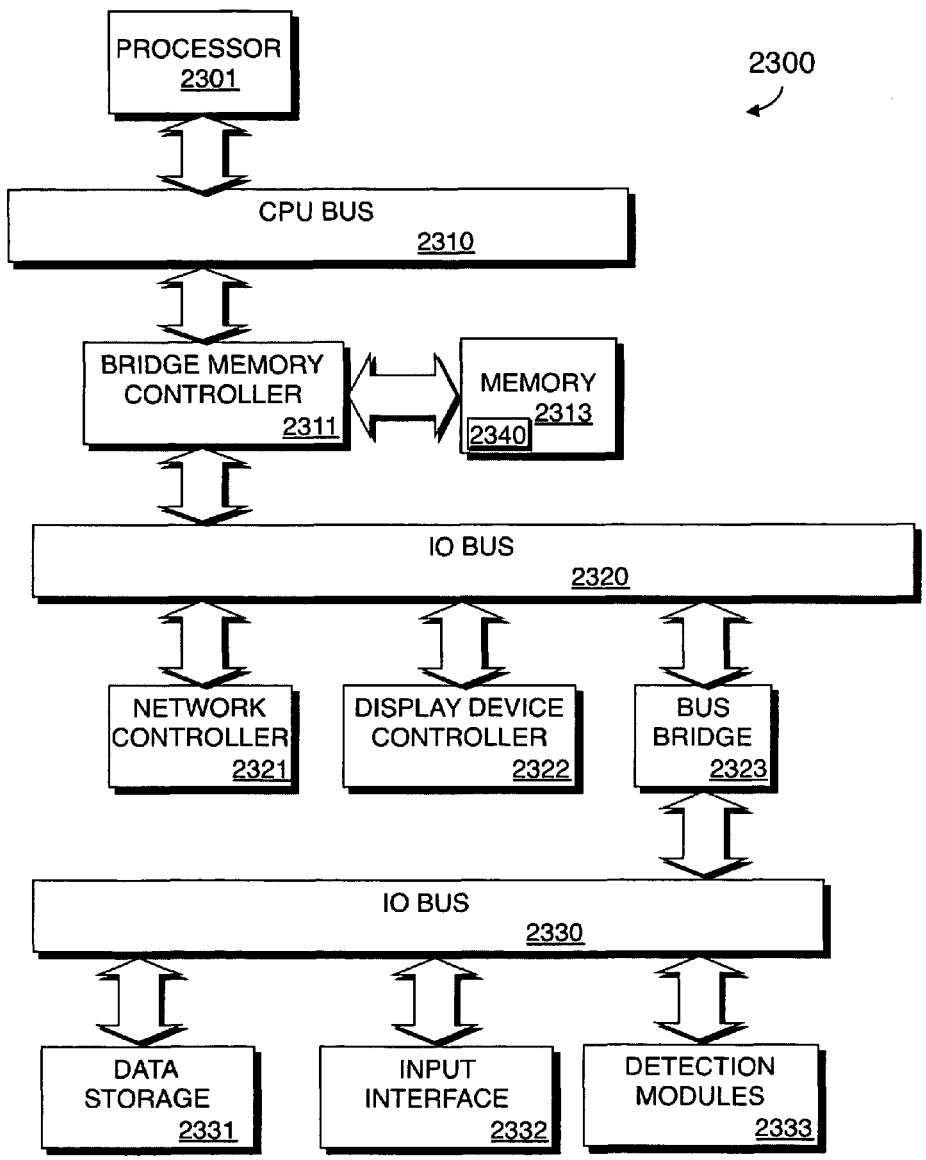
FIG. 23 is a block diagram of a computer system implementing the surveillance system according to an embodiment of the present invention.

FIG. 23 illustrates a block diagram of a computer system 2300 implementing a surveillance system according to an embodiment of the present invention. As shown, the computer system 2300 includes a processor 2301. The processor 2301 is coupled to a CPU bus 2310 that transmits data signals between the processor 2301 and other components in the computer system 2300.

The computer system 2300 includes a memory 2313. The memory 2313 may be a dynamic random access memory device, a static random access memory device, and/or other memory device. The memory 2313 may store instructions and code represented by data signals that may be executed by the processor 2301. A bridge memory controller 2311 is coupled to the CPU bus 2310 and the memory 2313. The bridge memory controller 2311 directs data signals between the processor 2301, the memory 2313, and other components in the computer system 2300 and bridges the data signals between the CPU bus 2310, the memory 2313, and a first IO bus 2320.

The first IO bus 2320 may be a single bus or a combination of multiple buses. The first IO bus 2320 provides communication links between components in the computer system 2300. A network controller 2321 is coupled to the first IO bus 920. The network controller 2321 may link the computer system 2300 to a network of computers (not shown) and supports communication among the machines. A display device controller 2322 is coupled to the first IO bus 2320. The display device controller 2322 allows coupling of a display device (not shown) to the computer system 2300 and acts as an interface between the display device and the computer system 2300. The display device may be used to present events to a user of a surveillance system.

A second IO bus 2330 may be a single bus or a combination of multiple buses. The second IO bus 2330 provides communication links between components in the computer system 2300. A data storage device 2331 is coupled to the second IO bus 2330. The data storage device 2331 may be a hard disk drive, a floppy disk drive, a CD-ROM device, a flash memory device or other mass storage device. An input interface 2332 is coupled to the second IO bus 2330. The input interface 2332 allows coupling of an input device to the computer system 2300 and transmits data signals from an input device to the computer system 2300. The input device may be used by a user to provide user feedback to events presented on a display device. Detection modules 2333 are coupled to the second IO bus 2330. The detection modules may include one or more video cameras, sensors, or other detection devices that generate data that may be processed by a video surveillance system. A bus bridge 2323 couples the first IO bus 2320 to the second IO bus 2330. The bus bridge 2323 operates to buffer and bridge data signals between the first IO bus 2320 and the second IO bus 2330. It should be appreciated that computer systems having a different architecture may also be used to implement the computer system 2300.

A surveillance system 2340 may reside in memory 2313 and be executed by the processor 2301. According to an embodiment of the present invention, the surveillance system 2340 may be implemented by the surveillance system 100 shown in FIG. 1.

It should be appreciated that embodiments of the present invention may be provided as a computer program product, or software, that may include a computer-readable or machine-readable medium having instructions. The instructions on the computer-readable or machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing electronic instructions. The techniques described herein are not limited to any particular software configuration. They may find applicability in any computing or processing environment. The terms "computer-readable medium" or "machine-readable medium" used herein shall include any medium that is capable of storing or encoding a sequence of instructions for execution by the computer and that cause the computer to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

In the foregoing specification, embodiments of the invention have been described with reference to specific exemplary embodiments thereof. It will, however, be evident that various modifications and changes may be made thereto without departing from the broader spirit and scope of the embodi-

What is claimed is:

1. A surveillance system for classifying detected events into one or more event types and utilizing user feedback as to whether an event of the detected events is a true event to improve accuracy, comprising:
   a video analytics engine embodied on a computer processor configured to:
      receive video data from at least one video camera;
      generate an on-line data set from received video data, where the on-line data set comprises events and feature data; and
      utilize event classifiers as tuning parameters to classify events;
   a feedback collection engine embodied on a computer processor configured to present an event to a user and receive feedback from the user as to whether the event is a true event that matches an event type being monitored by the surveillance system;
   an active learning engine embodied on a computer processor configured to:
      generate event classifiers using an on-line feature data set and feedback received from a user, where the event classifiers can be used to classify detected events into one or more event types;
      apply an event classifier to an event and calculate a confidence score for the event representing the confidence of classifying a positive sample;
      normalize a plurality of confidence scores of event classifiers by mapping outputs of event classifiers to a common domain;
      duplicate the on-line feature data set to K groups with different partitions where each group includes a training set and a validation set with no overlap;
      perform iterations of ensemble classifier learning to train a classifier for each of the K groups, where each iteration comprises:
         training a classifier for each group with a classification error for each group returned from the previous iteration;
         computing a classification error for each of the K groups by applying the classifier trained for each group to the corresponding validation set within the group;
         aggregating the computed classification errors to obtain an overall error and determining if a learning stop criterion is satisfied by the overall error;
         stopping if the learning stop criterion is satisfied; and
         continuing to the next iteration if the learning stop criterion is not satisfied; and
      output K ensemble classifiers; and
   a surveillance system manager embodied on a computer processor configured to apply an event classifier to a second on-line data set generated by the video analytics engine.

2. The surveillance system of claim 1 wherein the feature data includes images captured by the at least one video camera and the active learning engine is further configured to extract additional features from the images for classifier learning.

3. The surveillance system of claim 2 where the additional features include features extracted using rule-based classification, Harr-like features, and local binary pattern features.

4. The surveillance system of claim 1 wherein the event classifiers comprise the event types of human detection and vehicle detection.

5. The surveillance system of claim 1 wherein an event classifier operates to filter out unwanted events that are determined not to match the event type being monitored.

6. The surveillance system of claim 1 wherein an event classifier operates to sort, classify, and label events into one or more event types.

7. The surveillance system of claim 1 wherein the active learning engine is further configured to utilize off-line feature data from an off-line data set that includes only positive patterns collected from environments other than the present environment to generate event classifiers.

8. The surveillance system of claim 1 wherein the active learning engine is further configured to utilize off-line feature data that includes model data that represents a default average detection system such that the surveillance system maintains average performance for true events that have not been seen by utilizing the model data in generating event classifiers and improves accuracy by using the events that have been seen.

9. The surveillance system of claim 8 wherein the off-line feature data includes representative positive samples of human detection events and vehicle detection events.

10. The surveillance system of claim 1 wherein the event classifiers are generated based on annotation labels that describe the event type.

11. The surveillance system of claim 1 wherein the active learning engine is further configured to factor in expected error detection objectives into a generated event classifier.

12. A method for classifying detected events into one or more event types and utilizing user feedback as to whether an event of the detected events is a true event to improve accuracy using a video surveillance system, the method comprising:
   receiving video data from at least one video camera;
   generating an on-line data set from received video data, where the on-line data set comprises events and feature data;
   utilizing event classifiers as tuning parameters to classify events;
   presenting an event to a user and receiving feedback from the user as to whether the event is a true event that matches an event type being monitored by the surveillance system;
   generating event classifiers using an on-line feature data set and feedback received from a user, where the event classifiers can be used to classify detected events into one or more event types;
   applying an event classifier to an event and calculating a confidence score for the event representing the confidence of classifying a positive sample;
   normalizing a plurality of confidence scores of event classifiers by mapping outputs of event classifiers to a common domain;
   duplicating the on-line feature data set to K groups with different partitions where each group includes a training set and a validation set with no overlap;
   performing iterations of ensemble classifier learning to train a classifier for each of the K groups, where each iteration comprises:
      training a classifier for each group with a classification error for each group returned from the previous iteration;
      computing a classification error for each of the K groups by applying the classifier trained for each group to the corresponding validation set within the group;

aggregating the computed classification errors to obtain an overall error and determining if a learning stop criterion is satisfied by the overall error;

stopping if the learning stop criterion is satisfied; and continuing to the next iteration if the learning stop criterion is not satisfied;

outputting K ensemble classifiers; and applying an event classifier to a second on-line data set generated by the video analytics engine.

13. The method of claim 12 wherein the feature data includes images captured by the at least one video camera and the method further comprises extracting additional features from the images for classifier learning.

14. The method of claim 13 where the additional features include features extracted using rule-based classification, Harr-like features, and local binary pattern features.

15. The method of claim 12 wherein the event classifiers comprise the event types of human detection and vehicle detection.

16. The method of claim 12 wherein an event classifier operates to filter out unwanted events that are determined not to match the event type being monitored.

17. The method of claim 12 wherein an event classifier operates to sort, classify, and label events into one or more event types.

18. The method of claim 12 wherein generating event classifiers using an on-line feature data set and feedback received from a user further comprises utilizing off-line feature data from an off-line data set that includes only positive patterns collected from environments other than the present environment to generate event classifiers.

19. The method of claim 12 wherein generating event classifiers using an on-line feature data set and feedback received from a user further comprises utilizing off-line feature data that includes model data that represents a default average detection system such that the surveillance system maintains average performance for true events that have not been seen by utilizing the model data in generating event classifiers and improves accuracy by using the events that have been seen.

20. The method of claim 19 wherein the off-line feature data includes representative positive samples of human detection events and vehicle detection events.

21. The method of claim 12 wherein the event classifiers are generated based on annotation labels that describe the event type.

22. The method of claim 12 wherein generating event classifiers using an on-line feature data set and feedback received from a user further comprises factoring in expected error detection objectives into a generated event classifier.

* * * * *